(12) United States Patent
Luo et al.

(10) Patent No.: US 12,069,002 B2
(45) Date of Patent: Aug. 20, 2024

(54) METHOD EXECUTED BY USER EQUIPMENT, AND USER EQUIPMENT

(71) Applicants: SHARP KABUSHIKI KAISHA, Osaka (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 308 days.

(21) Appl. No.: 17/430,986

(22) PCT Filed: Feb. 10, 2020

(86) PCT No.: PCT/CN2020/074607
§ 371 (c)(1),
(2) Date: Aug. 13, 2021

(87) PCT Pub. No.: WO2020/164452
PCT Pub. Date: Aug. 20, 2020

(65) Prior Publication Data
US 2022/0140968 A1    May 5, 2022

(30) Foreign Application Priority Data
Feb. 14, 2019  (CN) .......................... 201910116786.6

(51) Int. Cl.
*H04L 5/00* (2006.01)
*H04W 72/0453* (2023.01)
*H04W 72/23* (2023.01)

(52) U.S. Cl.
CPC ....... *H04L 5/0096* (2013.01); *H04W 72/0453* (2013.01); *H04W 72/23* (2023.01);
(Continued)

(58) Field of Classification Search
CPC .. H04L 5/0096; H04W 72/0453; H04W 72/23
See application file for complete search history.

(56) References Cited

U.S. PATENT DOCUMENTS

2018/0206263 A1   7/2018  Lin
2018/0270794 A1   9/2018  Tiirola et al.
(Continued)

FOREIGN PATENT DOCUMENTS

| CN | 108307518 A | 7/2018 |
| CN | 108702267 A | 10/2018 |
| WO | 2018/030864 A1 | 2/2018 |

OTHER PUBLICATIONS

Ericsson, "Summary of 7.1.3.1.4 (DCI contents and formats)", R1-1805572, TSG-RAN WG1 #92bis, Sanya, China, Apr. 16-20, 2018.
(Continued)

*Primary Examiner* — Kevin C. Harper
(74) *Attorney, Agent, or Firm* — ScienBiziP, P.C.

(57) ABSTRACT

A method executed by a UE comprises: receiving DCI for scheduling a PDSCH transmission; determining, according to an FDRA field in the DCI, a RIV; if a frequency domain resource assignment scaling condition is not satisfied, determining, according to the RIV, a first starting resource block index and a first length of continuous resource blocks; if the frequency domain resource assignment scaling condition is satisfied, determining, according to the RIV, a second starting resource block index and a second length of continuous resource blocks, determining the first starting resource block index by multiplying the second starting resource block index by a scaling factor, and determining the first length of continuous resource blocks by multiplying the second length of continuous resource blocks by the scaling factor; and determining an allocated frequency resource based on the first starting resource block index and the first length of continuous resource blocks.

11 Claims, 5 Drawing Sheets

(52) U.S. Cl.
CPC .......... *H04L 5/0007* (2013.01); *H04L 5/0048* (2013.01); *H04L 5/0053* (2013.01)

(56) References Cited

U.S. PATENT DOCUMENTS

2019/0297605 A1* 9/2019 Kim ...................... H04W 72/23
2019/0313412 A1* 10/2019 Baldemair ............ H04W 36/00

OTHER PUBLICATIONS

Ericsson, "Summary of offline discussion on 7.1.3.1.4 (DCI contents and formats) part II", R1-1805638, TSG-RAN WG1 #92bis, Sanya, China, Apr. 16-20, 2018.

Wilus Inc., "Remaining Issues on DCI contents and formats", R1-1807233, 3GPP TSG RAN WG1 Meeting #93, Busan, Korea, May 21-25, 2018.
NTT Docomo, New SID Proposal: Study on New Radio Access Technology, 3GPP TSG RAN Meeting #71, Goteborg, Sweden, Mar. 7-10, 2016, RP-160671.
NTT Docomo, Inc., New WID on New Radio Access Technology, 3GPP TSG RAN Meeting #75, Dubrovnik, Croatia, Mar. 6-9, 2017, RP-170855.
Vodafone, New SID: Study on NR V2X, 3GPP TSG RAN Meeting #80, La Jolla, USA, Jun. 11-14, 2018, RP-181429.
3rd Generation Partnership Project; Technical Specification Group Radio Access Network; NR; Physical layer procedures for data (Release 15), 3GPP TS 38.214 V15.3.0 (Sep. 2018).
3rd Generation Partnership Project; Technical Specification Group Radio Access Network; NR; Multiplexing and channel coding (Release 15), 3GPP TS 38.212 V15.3.0 (Sep. 2018).

* cited by examiner

METHOD EXECUTED BY USER EQUIPMENT, AND USER EQUIPMENT

FIELD

The present disclosure generally relates to wireless communication technology, and more specifically, the present disclosure relates to methods executed by user equipment (UE) and corresponding user equipment.

BACKGROUND

In March 2016, at the RAN #71 plenary meeting of the 3rd Generation Partnership Project (3rd Generation Partnership Project, 3GPP), a new research project relating to the 5G technical standards (referring to Non-Patent Literature 1) was approved. The purpose of this research project is to develop a new radio (New Radio, NR) access technology to meet all 5G application scenarios, requirements and deployment environments. The NR has three main application scenarios: Enhanced Mobile Broadband (eMBB), Massive Machine Type Communication (mMTC) and Ultra-Reliable and Low Latency Communications: URLLC). In June 2017, at the RAN #75 plenary meeting of the 3rd Generation Partnership Project (3rd Generation Partnership Project: 3GPP), the corresponding 5G NR work project (referring to Non-Patent Literature 2) was approved.

The 5G uses DCI (Downlink Control Information) to schedule downlink transmission on PDSCH (Physical Downlink Shared Channel) and uplink transmission on PUSCH (Physical Uplink Shared Channel).

The 5G supports multiple DCI formats, as shown in Table 1. After channel coding of each DCI format, the CRC can be scrambled with an RNTI (Radio-Network Temporary Identifier) to indicate a specific use and/or one or more target UEs. For example, the CRC used to indicate the DCI format of paging may be scrambled with P-RNTI.

TABLE 1

DCI formats supported by 5G.

| DCI format | Use |
| --- | --- |
| 0_0 | Scheduling PUSCH in a cell |
| 0_1 | Scheduling PUSCH in a cell |
| 1_0 | Scheduling PDSCH in a cell |
| 1_1 | Scheduling PDSCH in a cell |
| 2_0 | Informing a set of UE with the slot format |
| 2_1 | Informing a set of UE with the Physical Resource Block (PRB) and Orthogonal Frequency-Division Multiplexing (OFDM) symbol assuming no transmission |
| 2_2 | Transmitting TPC (Transmit power control) instructions used for Physical Uplink Control Channel (PUCCH) and PUSCH |
| 2_3 | Transmitting a set of TPC instructions used for one or more UE Sounding Reference Signal (SRS) transmissions |

The 5G DCI is carried on the PDCCH (Physical Downlink Control Channel). One PDCCH is composed of one or more CCEs (control-channel elements), and one CCE is composed of multiple (for example, 6) REGs (resource-element groups), and the REG is defined in the CORESET (control-resource set). One CORESET includes multiple resource blocks in the frequency domain (each resource block is composed of 12 consecutive sub-carriers in the frequency domain), and includes one or more (for example, 1, 2, or 3) OFDM symbols in the time domain.

The UE monitors the PDCCH transmission of the base station on one or more search space sets, wherein, each search space set may correspond to a set of PDCCH candidates. The UE performs blind detection at the time and frequency position of the PDCCH candidate that is to be monitored to determine whether a PDCCH has been sent to the UE.

The search space set can be divided into a CSS (Common Search Space) set and a USS (UE-specific search space) set, for example:

Type 0-PDCCH CSS set is configured through the pdcch-ConfigSIB1 parameter in the Master Information Block (MIB), or through the searchSpaceSTB1 parameter in the PDCCH-ConfigCommon Information Element (IE), or through the searchSpaceZero parameter in the PDCCH-ConfigCommon IE.

The Cyclic Redundancy Check (CRC) of the corresponding DCI format can be scrambled with the SI-RNTI.

Type 0A-PDCCH CSS set is configured through the searchSpaceOtherSystemInformation parameter in the PDCCH-ConfigCommon IE. The CRC of the corresponding DCI format can be scrambled with the SI-RNTI.

Type 1-PDCCH CSS set. For example, it is configured through the ra-SearchSpace parameter in PDCCH-ConfigCommon IE. The CRC of the corresponding DCI format can be scrambled with the RA-RNTI or the TC-RNTI.

Type 2-PDCCH CSS set. For example, it is configured through the pagingSearchSpare parameter in PDCCH-ConfigCommon IE. The CRC of the corresponding DCI format can be scrambled with the P-RNTI.

Type 3-PDCCH CSS set. For example, it is configured through the searchSpacesToAddModList and the searchSpacesToReleaseList parameters in PDCCH-Config IE, the result is one or more type 3-PDCCH CSS configured through the SearchSpace IE, and each of the searchSpaceType parameters is configured as common. The CRC of the corresponding DCI format can be scrambled with the INT-RNTI, the SFI-RNTI, the TPC-PUSCH-RNTI, the TPC-PUCCH-RNTI, the TPC-SRS-RNTI the C-RNTI, the MCS-C-RNTI, or the CS-RNTI.

UE-specific Search Space (USS) set is configured through the searchSpacesToAddModList and the searchSpaces-ToReleaseList parameters in the PDCCH-Config IE, the result is one or more USS configured through the SearchSpace IE, and each of the searchSpaceType parameters is configured as UE-Specific. The CRC of the corresponding DCI format can be scrambled with the C-RNTI, the MCS-C-RNTI, the SP-CSI-RNTI, or the CS-RNTI.

The needs to assume a DCI size during blind detection of the PDCCH candidates. Due to the limitation of processing capacity, the UE can only monitor a certain number of DCI sizes in each time slot. Table 2 summarizes the types of search space sets classified according to the DCI size, their corresponding DCI formats, and the RNTI used to scramble DCI and CRC. Wherein, All rows of the same "DCI size category" (for example, a combination of all search space set types, DCI formats, and RNTI corresponding to 1_0_css) correspond to the same DCI size.

The "DCI size" column is merely examples of possible DCI sizes. For some DCI formats, the actual DCI size depends on system configuration information and/or UE-specific configuration information.

The DCI format associated with a given USS set can only be 0_0 and 1_0, or 0_1 and 1_1.

The type of search space set, DCI format and RNTI (for certain DCI formats) that the UE actually monitors depend on the system configuration information and/or UE-specific configuration information.

FDRA (Frequency Domain Resource Assignment) is a field defined in some DCI formats, and its size depends on configuration information related to frequency domain resource assignment. For example, in DCI formats 1_0 and 1_1, the size of FDRA is related to $N_{RB}^{DL,BWP}$ (for example, the size of FDRA can be $\lceil \log_2(N_{RB}^{DL,BWP}(N_{RB}^{DL,BWP}+1)/2)\rceil$ bits); in DCI formats 0_0 and 0_1, the size of FDRA is related to $N_{RB}^{UL,BWP}$. Wherein, the value of $N_{RB}^{DL,BWP}$ and $N_{RB}^{UL,BWP}$ depend on the DCI format and the type of the corresponding search space set, and may be adjusted to satisfy the limitation of the DCI size.

The search space set, DCI format, and RNTI configured by the network for the UE must satisfy all the following conditions:

The number of different DCI sizes configured for the UE in the cell cannot exceed 4.

The number of different DCI sizes for the C-RNTI configured for the UE in the cell cannot exceed 3.

The size of 0_0_uss cannot be equal to the size of 0_1_uss.

The size of 1_0_uss cannot be equal to the size of 1_1_uss.

TABLE 2

Correspondence between search space set type, DCI format and size, and RNTI.

| DCI size type | Search space set type | DCI format | RNTI | DCI size |
|---|---|---|---|---|
| 1_0_css | Type 0-PDCCH CSS | 1_0 | SI-RNTI | 28+FDRA |
| | Type 0A-PDCCH CSS | 1_0 | SI-RNTI | 28+FDRA |
| | Type 1-PDCCH CSS | 1_0 | RA-RNTI TC-RNTI | 28+FDRA |
| | Type 2-PDCCH CSS | 1_0 | P-RNTI | 28+FDRA |
| | Type 3-PDCCH CSS | 1_0 | C-RNTI MSC-C-RNTI CS-RNTI | 28+FDRA |
| 1_0_uss | USS | 1_0 | C-RNTI MSC-C-RNTI CS-RNTI | 28+FDRA |
| 0_0_css | Type 1-PDCCH CSS | 0_0 | TC-RNTI | 21+FDRA |
| | Type 3-PDCCH CSS | 0_0 | C-RNTI MSC-C-RNTI CS-RNTI | 21+FDRA |
| 0_0_uss | USS | 0_0 | C-RNTI MSC-C-RNTI CS-RNTI | 21+FDRA |
| 1_1_uss | USS | 1_1 | C-RNTI MSC-C-RNTI CS-RNTI | 62+FDRA |
| 0_1_uss | USS | 0_1 | C-RNTI MSC-C-RNTI CS-RNTI SP-CSI-RNTI | 68+FDRA |
| | Type 3-PDCCH CSS | 2_0 | SFI-RNTI | 128 |
| | Type 3-PDCCH CSS | 2_1 | INT-RNTI | 126 |
| | Type 3-PDCCH CSS | 2_2 | TPC-PUSCH-RNTI TPC-PUCCH-RNTI | Padding with 0 to align to the size of 1_0_css |
| | Type 3-PDCCH CSS | 2_3 | TPC-SRS-RNTI | Padding with 0 to align to the size of 1_0_css |

In order to satisfy the limitation of DCI size, the existing 3GPP 5G standard defines a DCI size alignment process as follows:

Step 0 (determine 0_0_css and 1_0_css, and align the size of 0_0_css to the size of 1_0_css):

Determine 0_0_css. Wherein,

The size of the frequency domain resource assignment field in DCI format 0_0 is related to $N_{RB}^{UL,BWP}$ (for example, the size of frequency domain resource assignment field is $\lceil \log_2(N_{RB}^{UL,BWP}(N_{RB}^{UL,BWP}+1)/2)\rceil$ bits), which is equal to the size of the initial uplink BWP (for example, it is configured through the initialUplinkBWP parameter).

The size of 0_0_css does not include padding bits.

Determine 1_0_css. Wherein,

The size of the frequency domain resource assignment field in DCI format 1_0 is related to $N_{RB}^{DL,BWP}$ (for example, the size of frequency domain resource assignment field is $\lceil \log_2(N_{RB}^{DL,BWP}(N_{RB}^{DL,BWP}+1)/2)\rceil$ bits). If CORESET 0 has been configured in the cell, then $N_{RB}^{DL,BWP}$ equal to the size of CORESET 0; if CORESET 0 is not configured in the cell, then $N_{RB}^{DL,BWP}$ equal to the size of the initial downlink BWP (for example, it is configured through the initialDownlinkBWP parameter).

If the UE is configured to monitor the DCI format 0_0 in the CSS, and the number of information bits of the 0_0_css before padding is less than the load size of the 1_0_css used to schedule the same cell, then zero padding is performed on the 0_0_css until the load size of 0_0_css is equal to the load size of 1_0_css.

If the UE is configured to monitor the DCI format 0_0 in the CSS, and the number of information bits of the 0_0_css before truncation is greater than the load size of the 1_0_css used to schedule the same cell, then, the number of most significant bits at the beginning of the frequency domain resource assignment field in the 0_0_css is truncated to reduce the bit width of the frequency domain resource assignment field, so that the size of 0_0_css is equal to the size of 1_0_css.

Step 1 (determine 0_0_uss and 1_0_uss, and align the smaller to the larger):

Determine 0_0_uss. Wherein,

The size of the frequency domain resource assignment field in DCI format 0_0 is related to $N_{RB}^{UL,BWP}$ (for example, the size of frequency domain resource assignment field is $\lceil \log_2(N_{RB}^{UL,BWP}(N_{RB}^{UL,BWP}+1)/2)\rceil$ bits). $N_{RB}^{UL,BWP}$ is equal to the size of the active uplink BWP.

The size of 0_0_uss does not include padding bits.

Determine 1_0_uss. Wherein,

The size of the frequency domain resource assignment field in DCI format 1_0 is related to $N_{RB}^{DL,BWP}$ (for example, the size of frequency domain resource assignment field is $\lceil \log_2(N_{RB}^{DL,BWP}(N_{RB}^{DL,BWP}+1)/2)\rceil$ bits). $N_{RB}^{DL,BWP}$ is equal to the size of the active downlink BWP.

If the UE is configured to monitor the DCI format 0_0 in the USS, and the number of information bits of the 0_0_uss before padding is less than the load size of the 1_0_uss used to schedule the same cell, then perform zero padding on the 0_0_uss until the load size of 0_0_uss is equal to the load size of 1_0_uss.

If the UE is configured to monitor the DCI format 1_0 in the USS, and the number of information bits of the 1_0_uss before padding is less than the load size of the 0_0_uss used to schedule the same cell, then perform zero padding on the 1_0_uss until the load of 1_0_uss is equal to the load of 0_0_uss.

Step 2 (if necessary, pad 0_1_uss and/or 1_1_uss with 0, so that the size of either of them is not equal to the size of 0_0_uss/1_0_uss):

If the size of 0_1_uss is equal to 0_0_uss/1_0_uss (0_0_uss and 1_0_uss are equal in size after Step 1), then one zero padding bit is appended to the last field of 0_1_uss.

If the size of 1_1_uss is equal to 0_0_uss/1_0_uss, one zero padding bit is appended to the last field of 1_1_uss.

Step 3 (if the limitation of the DCI size is satisfied, the process ends):

If the following two conditions are satisfied, the DCI size alignment process ends:

The total number of different DCI sizes configured for the UE in the cell does not exceed 4.

The total number of different DCI sizes for the C-RNTI configured for the UE in the cell does not exceed 3.

Step 4 (otherwise Step 2 is cancelled, 1_0_uss and 0_0_uss are re-determined, and the sizes of 1_0_uss and 0_0_uss are aligned to 1_0_css/0_0_css):

Otherwise,

Remove the padding bits introduced in Step 2 (if any).

Determine 1_0_uss. Wherein,

The size of the frequency domain resource assignment field in DCI format 1_0 is related to $N_{RB}^{DL,BWP}$ (for example, the size of frequency domain resource assignment field is $\lceil \log_2(N_{RB}^{DL,BWP}(N_{RB}^{DL,BWP}+1)/2) \rceil$ bits). If CORESET 0 has been configured in the cell, then $N_{RB}^{DL,BWP}$ equal to the size of CORESET 0; if CORESET 0 is not configured in the cell, then $N_{RB}^{DL,BWP}$ equal to the size of initial downlink BWP (for example, it is configured through the initialDownlinkBWP parameter).

Determine 0_0_uss. Wherein,

The size of the frequency domain resource assignment field in DCI format 0_0 is to $N_{RB}^{UL,BWP}$ (for example, the size of frequency domain resource assignment field is $\lceil \log_2(N_{RB}^{UL,BWP}(N_{RB}^{UL,BWP}+1)/2) \rceil$ bits), $N_{RB}^{UL,BWP}$ is equal to the size of initial uplink BWP (for example, it is configured through the initialUplinkBWP parameter).

The size of 0_0_uss does not include padding bits.

If the number of information bits of the 0_0_uss before padding is less than the load size of the 1_0_uss used to schedule the same cell, then zero padding is performed on the 0_0_uss until the load size of 0_0_uss is equal to the load size of 1_0_uss.

If the number of information bits of the 0_0_uss before truncation is greater than the load size of the 1_0_uss used to schedule the same cell, then, the number of most significant bits at the beginning of the frequency domain resource assignment field in the 0_0_uss is truncated to reduce the bit width of the frequency domain resource assignment field, so that the size of 0_0_uss is equal to the size of 1_0_uss.

It can be seen that if the above DCI size alignment process is executed to Step 4, then the size of 1_0_uss is determined by the size of 1_0_css. Correspondingly, the size of the frequency domain resource assignment field in 1_0_uss is also determined by the size of the initial downlink bandwidth part (BWP) or CORESET 0. On the other hand, the frequency domain resources assigned by 1_0_uss are on the active downlink BWP, therefore, if the size of the active downlink BWP and the size of the initial downlink BWP or CORESET 0 are significantly different, the frequency domain resources that can be assigned by 1_0_uss may be limit significantly. For example, the active downlink BWP size is 100 PRBs, and the initial downlink BWP size is 20 PRBs (CORESET 0 is not configured in the cell, so the size of the frequency domain resource assignment field of 1_0_css is determined by the initial downlink BWP), then the frequency domain resource assignment of 1_0_uss The field can only assign a part of the PRB in the active downlink BWP. Therefore, the existing 3GPP standards for 5G have introduced "scaling" for frequency domain resource assignment.

In the existing 3GPP standard specifications for 5G, when the size of 1_0_uss is derived from 1_0_css but is applied to an active downlink BWP different from the initial downlink BWP, scaling is required for frequency domain resource BWP assignment. Specifically, when the size of 1_0_uss is derived from 1_0_css and applied to another active downlink BWP (for example, when it is not the active downlink BWP of the initial downlink BWP, record its size as $N_{BWP}^{active}$), in downlink frequency domain resource assignment type 1, the FDRA field includes a Resource Indication Value (RIV), and each RIV corresponds to a starting resource block $RB_{start}=0$, K, 2·K, ..., $(N_{BWP}^{initial}-1)\cdot K$ and the length of a continuously allocated resource block $L_{RSs}=K$, 2·K, ..., $N_{BWP}^{initial}\cdot K$. Wherein, if CORESET 0 has been configured in the cell, then $N_{BWP}^{active}$ is equal to the size of CORESET 0; if CORESET 0 is not configured in the cell, then $N_{BWP}^{active}$ is equal to the size of the initial downlink BWP.

The resource indication value can be defined as follows:

If $(L'_{RBs}-1) \leq \lfloor N_{BWP}^{initial}/2 \rfloor$, then $RIV = N_{BWP}^{initial}(L'_{RBs}-1) + RB'_{start}$ otherwise, $RIV = N_{BWP}^{initial}(N_{BWP}^{initial} - L'_{RBs} - 1) + (N_{BWP}^{initial} - 1 - RB'_{start})$ wherein, $L'_{RBs} = L_{RBs}/K$, $RB'_{start} = RB_{start}/K$, $L'_{RBs}$ does not exceed $N_{BWP}^{initial} - RB'_{start}$. If $N_{BWP}^{active} < N_{BWP}^{initial}$, then K is the maximum value in {1, 2, 4, 8} that satisfies $K \leq \lfloor N_{BWP}^{active}/N_{BWP}^{initial} \rfloor$; otherwise K=1.

Similarly, if the above DCI size alignment process is executed to Step 4, the uplink frequency domain resource assignment also needs to be scaled in a similar manner.

In the existing 3GPP standards on 5G, when the assigned frequency domain resources do not need to be scaled, in the downlink (uplink) frequency domain resource assignment type 1, the FDRA field includes a RIV (Resource Indication Value), each RIV corresponds to a starting resource block $RB_{start}$ and the length of a continuously allocated resource block $L_{RBs}$. Wherein, the resource indication value can be defined as follows:

If $(L_{RBs}-1) \leq \lfloor N_{BWP}^{size}/2 \rfloor$, then $RIV = N_{BWP}^{size}(L_{RBs}-1) + RB_{start}$ otherwise, $RIV = N_{BWP}^{size}(N_{BWP}^{size} - L_{RBs} + 1) + (N_{BWP}^{size} - 1 - RB_{start})$ wherein, $L_{RBs} \geq 1$ and does not exceed $N_{BWP}^{size} - RB_{start}$. If the DCI corresponding to the FDRA field is 1_0_css (0_0_css), $N_{BWP}^{size} = N_{BWP}^{initial}$; otherwise, $N_{BWP}^{size} = N_{BWP}^{active}$.

In the existing 3GPP standards for 5G, the mechanisms related to frequency domain resource assignment have at least the following issues:

In downlink frequency domain resource assignment type 1, when the assigned frequency domain resources need to be scaled, the value range of $RB_{start}$ and $L_{RBs}$ is always defined with reference to $N_{BWP}^{initial}$; if $N_{BWP}^{active} < N_{BWP}^{initial}$, then the value range of $RB_{start}$ and $L_{RBs}$ fall outside the active downlink BWP. When the assigned frequency domain resources do not need to be scaled, and the DCI corresponding to the FDRA field is 1_0_css but the active downlink BWP is not the initial downlink BWP, the value range for $RB_{start}$ and $L_{RBs}$ is also defined with reference to $N_{BWP}^{initial}$, so there exists similar issues.

In uplink frequency domain resource assignment type 1, when the assigned frequency domain resources need to be scaled, the value range of $RB_{start}$ and $L_{RBs}$ is always defined with reference to $N_{BWP}^{initial}$; if $N_{BWP}^{active} < N_{BWP}^{initial}$, then the value range of $RB_{start}$ and $L_{RBs}$ fall outside the active uplink BWP. When the assigned frequency domain resources do not need to be scaled, and the DCI corresponding to the FDRA field is 0_0_css but the active uplink BWP is not the initial uplink BWP, the value range for $RB_{start}$ and $L_{RBs}$ is also defined with reference to $N_{BWP}^{initial}$, so there exists similar issues.

Furthermore, in the existing 3GPP standards for 5G, there are at least the following issues in the process of determining the channel raster to resource element mapping, and/or the bandwidth and/or location of the RF channel:

There is an ambiguity in the subcarrier spacing of the subcarrier corresponding to the RF reference frequency used to identify the location of the RF channel.

Furthermore, as 3GPP recognizes more advanced V2X (Vehicle-to-everything) service requirements, the standardization of V2X based on 5G has been brought forward. V2X communications refer to the communications between a vehicle and any entity that may affect the vehicle. Typical V2X communications include V2I (Vehicle-to-Infrastructure), V2N (Vehicle-to-Network), V2V (Vehicle-to-Vehicle), V2P (Vehicle-to-Pedestrian) etc. In June 2018, at the 3GPP RAN #80 plenary meeting, a new research project on 3GPP NR V2X (referring to Non-Patent Literature 3, hereinafter referred to as V2X (Rel-16) research project, or the V2X Phase 3 research project) was approved. In V2X (Rel-16), the interface between UE and UE used to implement V2X communications is referred to as PC5, and is also referred to as sidelink at the physical layer (referred to as "straight line" or "side line" in the present disclosure, or abbreviated as SL), to distinguish it from uplink and downlink. One of the goals of the V2X (Rel-16) research project is to study the design of a new SL interface based on NR.

The signals and channels used for SL synchronization in V2X (Rel-16) include:

SL PSS (Sidelink Primary Synchronization Signal), also referred to as S-PSS, or PSSS (Primary Sidelink Synchronization Signal).

SL SSS (Sidelink Secondary Synchronization Signal), also referred to as S-SSS, or SSSS (Secondary Sidelink Synchronization Signal).

PSBCH (Physical Sidelink Broadcast Channel).

SL PSS, SL SSS, and PSBCH are organized into blocks on the time-frequency resource raster, referred to as SL SSB (Sidelink SS/PBCH block), or S-SSB. The transmission bandwidth of the SL SSB is within the SL BWP (Sidelink Bandwidth Part) configured for the UE.

Other channels in V2X (Rel-16) include at least:
PSSCH (Physical Sidelink Shared Channel).
PSCCH (Physical Sidelink Control Channel).
PSFCH (Physical Sidelink Feedback Channel).

In V2X (Rel-16). the possible issues faced by the design of SL links include at least:

The scrambling sequence between the SL channels sent by different UEs may conflict.

UE IDs determined by different UEs (especially short IDs, such as physical layer IDs) may conflict, which result in failure to correctly identify the source and/or destination UE ID at the physical layer.

The UE implemented according to the old version of the standard protocol may not be able to recognize the Sidelink Control Information (SCI) format implemented according to the new version of the standard protocol, and thus the resource reservation field in the new SCI format cannot be read, and the reservation of the new UE resources cannot be understood which leads to resource reservation conflicts.

The UE may not be able to recognize at the physical layer whether the received PSCCH/PSSCH transmission is for unicast, groupcast or broadcast communications.

PRIOR ART LITERATURE

Non-Patent Literature

Non-Patent Literature 1: RP-160671, New SID Proposal: Study on News Radio Access Technology.
Non-Patent Literature 2: RP-170855, New WID on New Radio Access Technology.
Non-Patent Literature 3: RP-181429, New SID: Study on NR V2X.

SUMMARY

In order to solve at least a part of the above problems, the present disclosure provides a method executed by a user equipment and a user equipment, which can ensure that the frequency domain resources assignment in the DCI fall within the active downlink BWP, and avoid the interference between users caused bye the assigned frequency domain resources falling outside the active downlink BWP.

According to the present disclosure, there is provided a method executed by a user equipment for wireless communication, the method comprising: receiving downlink control information (DCI) for scheduling a physical downlink shared channel (PDSCH) transmission; determining, according to a frequency domain resource assignment (FDRA) field in the received DCI, a resource indication value (RIV); if a frequency domain resource assignment scaling condition is not satisfied, determining, according to the RIV, a first starting resource block index (denoted as $RB_{start}$) and a first length of continuous resource blocks (denoted as $L_{RBs}$); if the frequency domain resource assignment scaling condition is satisfied, determining, according to the RIV, a second starting resource block index (denoted as $RB'_{start}$) and a second length of continuous resource blocks (denoted as $L'_{RBs}$), determining the first starting resource block index by multiplying the second starting resource block index by a scaling factor (denoted as K), and determining the first length of continuous resource blocks by multiplying the second length of continuous resource blocks by the scaling factor; and determining an allocated frequency resource based on the first starting resource block index and the first length of continuous resource blocks. The scaling factor is determined according to a ratio of a size of an active downlink bandwidth part (BWP) (denoted as $N_{BWP}^{active}$) to a size of an initial downlink BWP (denoted as $N_{BWP}^{initial}$).

Preferably, the frequency domain resource assignment scaling condition comprises: a size of a format of the DCI that is derived from a first reference size,
the first reference size is defined based on any one of the following:
a size of a DCI format 1_0 monitored in a common search space (CSS);
a size of a DCI format 0_0 monitored in the CSS;

a common size of the DCI format 1_0 and the DCI format 0_0 monitored in the CSS;
a size of a control resource set (CORESET) 0, which is a CORESET with an identity (ID) 0;
a size of the initial downlink BWP;
a size of the active downlink BWP;
if the CORESET 0 in the cell is configured, the first reference size is equal to the size of the CORESET 0; if the CORESET 0 is not configured in the cell, the first reference size is equal to the size of the initial downlink BWP;
a predefined constant;
a pre-configured value; and
a value of a parameter obtained from a base station, or when the parameter is not configured, a default value is used.

Preferably, the frequency domain resource assignment scaling condition comprises: a size of a format of the DCI is applied to a reference BWP that satisfies a reference BWP condition,
the reference BWP is any of the following:
the active downlink BWP;
the initial downlink BWP;
a BWP indicated in the format of the DCI;
a pre-defined BWP or a pre-configured BWP; and
a BWP configured by a parameter obtained from a base station, or when the parameter is not configured, a default BWP is used.

According to the present disclosure, there is provided a method executed by a user equipment for wireless communication, the method comprising: receiving downlink control information (DCI) for scheduling a physical uplink shared channel (PUSCH) transmission; determining, according to a frequency domain resource assignment (FDRA) field in the received DCI, a resource indication value (RIV); if a frequency domain resource assignment scaling condition is not satisfied, determining, according to the RIV a first starting resource block index (denoted as $RB_{start}$) and a first length of continuous resource blocks (denoted as $L_{RBs}$); if the frequency domain resource assignment scaling condition is satisfied, determining, according to the RIV, a second starting resource block index (denoted as $RB'_{start}$) and a second length of continuous resource blocks (denoted as $L'_{RBs}$), determining the first starting resource block index by multiplying the second starting resource block index by a scaling factor (denoted as K), and determining the first length of continuous resource blocks by multiplying the second length of continuous resource blocks by the scaling factor; and determining an allocated frequency resource based on the first starting resource block index and the first length of continuous resource blocks. The scaling factor is determined according to a ratio of a size of an active uplink bandwidth part (BWP) (denoted as $N_{BWP}^{active}$) to a size of an initial uplink BWP (denoted as $N_{BWP}^{initial}$).

Preferably, the frequency domain resource assignment scaling condition comprises: a size of a format of the DCI that is derived from a third reference size,
the third reference size is defined based on any one of the following:
a size of a DCI format 1_0 monitored in a common search space (CSS);
a size of a DCI format 0_0 monitored in the CSS;
a common size of the DCI format 1_0 and the DCI format 0_0 monitored in the CSS;
a size of the initial uplink BWP;
a size of the active uplink BWP;
a predefined constant;
a pre-configured value; and
a value of a parameter obtained from a base station, or when the parameter is not configured, a default value is used.

Preferably, the frequency domain resource assignment scaling condition comprises: a size of a format of the DCI that is applied to a reference BWP that satisfies a reference BWP condition,
the reference BWP is any of the following:
the active uplink BWP;
the initial uplink BWP;
a BWP indicated in the format of the DCI;
a pre-defined BWP or a pre-configured BWP; and
a BWP configured by a parameter obtained from a base station, or when the parameter is not configured, a default BWP is used.

Furthermore, according to the present disclosure, there is provided a user equipment comprising: a processor; and a memory configured to store instructions, which when executed by the processor, cause the user equipment to execute a method according to disclosed herein.

Effects of Invention

According to the present disclosure, it can be ensured that the frequency domain resources assigned in the DCI fall within the active downlink BWP, and the user interference between users caused by the assigned frequency domain resources falling outside the active downlink BWP is avoided.

BRIEF DESCRIPTION OF THE DRAWINGS

The above and further features of the present disclosure will be more apparent with the detailed descriptions with the accompanying drawings, in which.

DESCRIPTION

Figure 1:
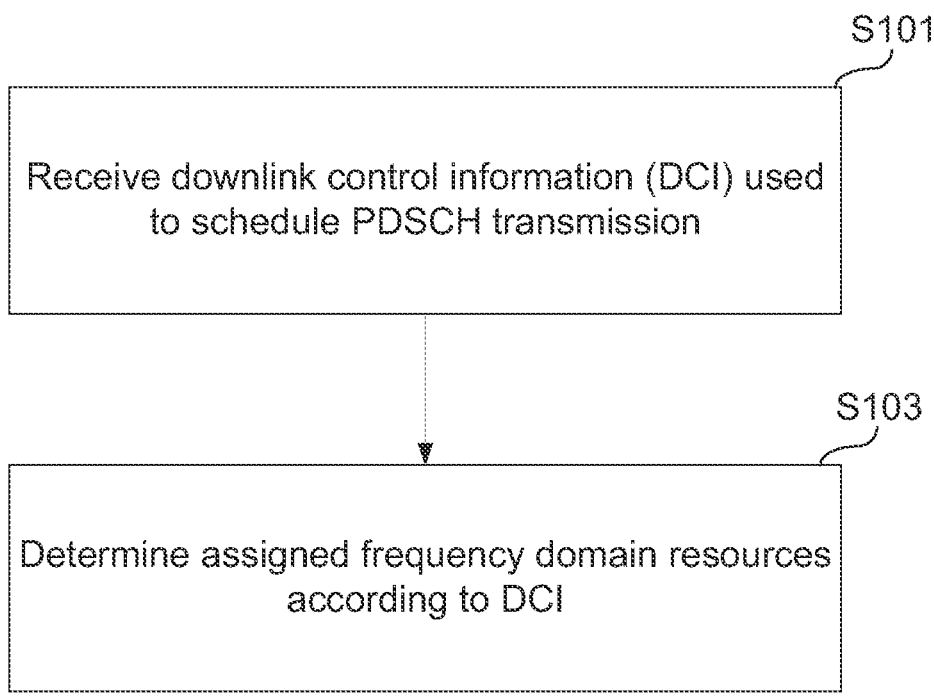
FIG. 1 is a flow chart of a method executed by a user equipment according to the first implementation of the present disclosure.

The present disclosure will be described in detail below with reference to the drawings and specific implementations. It should be noted that the present disclosure should not be limited to the specific implementations described below. In addition, for brevity, detailed descriptions of well-known technologies that are not directly related to the present disclosure are omitted to prevent confusion in the understanding of the present disclosure.

Hereinafter, taking the 5G mobile communications system and its subsequent evolved versions as an example application environment, multiple implementations according to the present disclosure are described in detail. However, it should be noted that the present disclosure is not limited to the following implementations but can be applied to more other wireless communications systems, such as communications systems beyond 5G, and the 4G mobile communications systems before 5G.

The following describes some of the terms used in the present disclosure. Unless otherwise specified, the terms used in the present disclosure are defined herein. The terms given in the present disclosure may adopt different naming conventions in the LTE, LTE-Advanced, LTE-Advanced Pro, NR and later communications systems, but the unified terminology is used in the present disclosure, and when applied to a specific system, they can be replaced with the terms used in the corresponding system.

3GPP: 3rd Generation Partnership Project
BWP: Bandwidth Part
CA: Carrier Aggregation
CCE: Control-Channel Element
CORESET: Control-Resource Set
CP: Cyclic Prefix
CP-OFDM: Cyclic Prefix Orthogonal Frequency Division Multiplexing
CRB: Common Resource Block
CRC: Cyclic Redundancy Check
CSS: Common Search Space
DC: Dual Connectivity
DCI: Downlink Control Information
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband
FDRA: Frequency Domain Resource Assignment
FR1: Frequency Range 1
FR2: Frequency Range 2
IE: information Element
IP: Internet Protocol
LCID: Logical Channel
LTE-A: Long Term Evolution-Advanced
MAC: Medium Access Control
MAC CE: MAC Control Element
MCG: Master Cell Group
MIB: Master information Block
mMTC: Massive Machine Type Communication
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol
PDSCH: Physical Downlink Shared Channel
PSBCH: Physical Sidelink Broadcast Channel
PSCCH: Physical Sidelink Control Channel
PSSCH: Physical Sidelink Shared Channel
PRB: Physical Resource Block
PSS: Primary Synchronization Signal
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
RAR: Random Access Response
RB: Resource Block
RE: Resource Element
REG: Resource-Element Group
RF: Radio Frequency
RLC: Radio Link Control
RNTI: Radio-Network Temporary Identifier
RRC: Radio Resource Control
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL PSS: Sidelink Primary Synchronization Signal
SL SSB: Sidelink SS/PBCH block
SL SSS: Sidelink Secondary Synchronization Signal
SpCell: Special Cell
SRS: Sounding Reference Signal
SSB: SS/PBCH block
SSS: Secondary Synchronization Signal
SSSS: Secondary Sidelink Synchronization Signal
STAG: Secondary Timing Advance Group
SUL: Supplementary Uplink
TA: Timing Advance
TAG: Timing Advanced Group
TCP: Transmission Control Protocol
TDD: Time Division Duplexing
TPC: Transmit Power Control
UE: User Equipment
UL: Uplink
URLLC: Ultra-Reliable and Low Latency Communication
USS: UE-specific Search Space
V2I: Vehicle-to-infrastructure
V2N: Vehicle-to-Network
V2P: Vehicle-to-Pedestrian
V2V: Vehicle-to-Vehicle
V2X: Vehicle-to-Everything Implementation 1

The method executed by the user equipment in Implementation 1 of the present disclosure will be described hereinafter with references to FIG. 1.

FIG. 1 is a flow chart of a method executed by a user equipment according to the first implementation of the present disclosure.

As shown in FIG. 1, implementation 1 of the present disclosure, the steps performed by the user equipment UE include: Step S101 and Step S103.

Specifically, at Step S101, downlink control information (DCI) is received.

Wherein,

The DCI may be used to schedule PDSCH transmission (for example, using DCI format 1_0), and may also be used for other purposes.

The DCI may be a DCI monitored in a UE-specific Search Space (USS). For example, the search space in the search space set configured through the SearchSpace IE, wherein the searchSpaceType parameter is configured as UE-Specific.

The DCI may also be a DCI monitored in a Common Search Space (CSS). For example, the search space in the search space set configured through the SearchSpace IE, wherein the searchSpaceType parameter is configured as common; another example is the search space configured through the pdcch-ConfigSIB1 parameter; another example is the search space configured through the searchSpaceSIB1 parameter; another example is configured through the searchSpaceZero parameter Search space; another example is the search space configured through the searchSpaceOtherSystemInformation parameter; another example is the search space configured through the ra-SearchSpace parameter; another example is the search space configured through the pagingSearchSpace parameter.

The CRC of the DCI may be scrambled with the C-RNTI, MCS-C-RNTI, CS-RNTI, or other RNTI.

The DCI may include a Frequency Domain Resource Assignment (FDRA) field.

The frequency domain resource assignment method used by the DCI may be downlink resource allocation type 1 (type 1), or other downlink resource assignment types (when applicable).

Furthermore, at Step S103, the assigned frequency domain resources are determined according to the DCI. For example, a Resource Indication Value (RIV) is determined according to the FDRA field in the DCI. For example, the RIV is equal to the value corresponding to some bits of the FDRA field, and for example, the RIV is equal to the value corresponding to all bits of the FDRA field. Each value of the RIV corresponds to a starting resource block index of a continuously allocated resource block (denoted as $RB_{start}$) and the length of the continuously allocated resource block (denoted as $L_{RBs}$). The resource block may be a Virtual Resource Block (VRB) or a Physical Resource Block (PRB). The definition and/or value range of the RIV and/or the $L_{RBs}$ and/or the $RB_{start}$ may be related to frequency domain resource assignment scaling conditions.

For example, if the frequency domain resource assignment scaling condition is satisfied, the RIV may be defined as follows:

If $(L'_{RBs}-1) \leq [N_{BWP}^{initial}/2]$, then $$RIV = N_{BWP}^{initial}(L'_{RBs}-1) + RB'_{start}$$

otherwise, $$RIV = N_{BWP}^{initial}(N_{BWP}^{initial} - L'_{RBs} - 1) + (N_{BWP}^{initial} - 1 - RB'_{start})$$

Wherein, optionally, one or more of the following are established:

$L'_{RBs}$ may be equal to $L_{RBs}/K$.

$RB'_{start}$ may be equal to $RB_{start}/K$.

$RB'_{start}$ and/or $L'_{RBs}$ can satisfy one or more of the following relationships (any combination of "and" or "or" when applicable):

$L'_{RBs} \geq 1$ $L'_{RBs} \leq \min(N_{BWP}^{initial} \cdot K, N_{BWP}^{active}) - RB'_{start}$ $L'_{RBs} \leq \min(N_{BWP}^{initial}, N_{BWP}^{active}) - RB'_{start}$ $L'_{RBs} \leq N_{BWP}^{initial} - RB'_{start}$ $L'_{RBs} \leq N_{BWP}^{active} - RB'_{start}$ $L'_{RBs} \leq \min(N_{BWP}^{initial} \cdot K, N_{BWP}^{active})/K - RB'_{start}$ $L'_{RBs} \cdot K \leq \min(N_{BWP}^{initial} \cdot K, N_{BWP}^{active}) - RB'_{start} \cdot K$ $L'_{RBs} \leq [\min(N_{BWP}^{initial} \cdot K, N_{BWP}^{active})/K] - RB'_{start}$ $L'_{RBs} \leq [\min(N_{BWP}^{initial} \cdot K, N_{BWP}^{active})/K] - RB'_{start}$ $L'_{RBs} \leq \min(N_{BWP}^{initial}, N_{BWP}^{active})/K - RB'_{start}$ $L'_{RBs} \cdot K \leq \min(N_{BWP}^{initial}, N_{BWP}^{active}) - RB'_{start} \cdot K$ $L'_{RBs} \leq [\min(N_{BWP}^{initial}, N_{BWP}^{active})/K] - RB'_{start}$ $L'_{RBs} \leq [\min(N_{BWP}^{initial}, N_{BWP}^{active})/K] - RB'_{start}$ $L'_{RBs} \leq N_{BWP}^{initial}/K - RB'_{start}$ $L'_{RBs} \cdot K \leq N_{BWP}^{initial} - RB'_{start} \cdot K$ $L'_{RBs} \leq [N_{BWP}^{initial}/K] - RB'_{start}$ $L'_{RBs} \leq [N_{BWP}^{initial}/K] - RB'_{start}$ $L'_{RBs} \leq N_{BWP}^{active}/K - RB'_{start}$ $L'_{RBs} \cdot K \leq N_{BWP}^{active} - RB'_{start} \cdot K$ $L'_{RBs} \leq [N_{BWP}^{active}/K] - RB'_{start}$ $L'_{RBs} \leq [N_{BWP}^{active}/K] - RB'_{start}$ If $N_{BWP}^{active} > N_{BWP}^{initial}$, then $L'_{RBs} \leq N_{BWP}^{initial} - RB'_{start}$; otherwise $L'_{RBs} \leq N_{BWP}^{active} - RB'_{start}$ If $N_{BWP}^{active} > N_{BWP}^{initial}$, then $L'_{RBs} \leq N_{BWP}^{initial} - RB'_{start}$; otherwise $L'_{RBs} \leq N_{BWP}^{active}/K - RB'_{start}$ If $N_{BWP}^{active} > N_{BWP}^{initial}$, then $L'_{RBs} \leq N_{BWP}^{initial} - RB'_{start}$; otherwise $L'_{RBs} \cdot K \leq N_{BWP}^{active}/K - RB'_{start} \cdot K$ If $N_{BWP}^{active} > N_{BWP}^{initial}$, then $L'_{RBs} \leq N_{BWP}^{initial} - RB'_{start}$; otherwise $L'_{RBs} \leq [N_{BWP}^{active}/K] - RB'_{start}$ If $N_{BWP}^{active} > N_{BWP}^{initial}$, then $L'_{RBs} \leq N_{BWP}^{initial} - RB'_{start}$; otherwise $L'_{RBs} \leq [N_{BWP}^{active}/K] - RB'_{start}$ If K>1, then $L'_{RBs} \leq N_{BWP}^{initial} - RB'_{start}$; otherwise $L'_{RBs} \leq N_{BWP}^{active} - RB'_{start}$ If K>1, then $L'_{RBs} \leq N_{BWP}^{initial} - RB'_{start}$; otherwise $L'_{RBs} \leq N_{BWP}^{active}/K - RB'_{start}$ If K>1, then $L'_{RBs} \leq N_{BWP}^{initial} - RB'_{start}$; otherwise $L'_{RBs} \cdot K \leq N_{BWP}^{active}/K - RB'_{start} \cdot K$ If K>1, then $L'_{RBs} \leq N_{BWP}^{initial} - RB'_{start}$; otherwise $L'_{RBs} \leq [N_{BWP}^{active}/K] - RB'_{start}$ If K>1, then $L'_{RBs} \leq N_{BWP}^{initial} - RB'_{start}$; otherwise $L'_{RBs} \leq [N_{BWP}^{active}/K] - RB'_{start}$ If $N_{BWP}^{active} > N_{BWP}^{initial}$, then K is the maximum value in {1, 2, 4, 8} that satisfies $K \leq [N_{BWP}^{active}/N_{BWP}^{initial}]$; otherwise K=1. K may also be defined in other methods.

The value range of $RB_{start}$ may be any of the following:

$RB_{start} = 0, K, 2 \cdot K, \ldots, \min(N_{BWP}^{initial} \cdot K, N_{BWP}^{active}) - K$ $RB_{start} = 0, K, 2 \cdot K, \ldots, \min(N_{BWP}^{initial} \cdot K, N_{BWP}^{active}) - 1) \cdot K$ $RB_{start} = 0, K, 2 \cdot K, \ldots, (N_{BWP}^{initial} - 1) \cdot K$ $RB_{start} = 0, K, 2 \cdot K, \ldots, (N_{BWP}^{active} - 1) \cdot K$ If $N_{BWP}^{active} > N_{BWP}^{initial}$, then $RB_{start} = 0, K, 2 \cdot K, \ldots, N_{BWP}^{initial} \cdot K - K$; otherwise $RB_{start} = 0, 1, 2, \ldots, N_{BWP}^{active} - 1$ If $N_{BWP}^{active} > N_{BWP}^{initial}$, then $RB_{start} = 0, K, 2 \cdot K, \ldots, N_{BWP}^{initial} \cdot K - K$; otherwise $RB_{start} = 0, K, 2 \cdot K, \ldots, N_{BWP}^{active} - K$ If K>1, then $RB_{start} = 0, K, 2 \cdot K, \ldots, N_{BWP}^{initial} \cdot K - K$; otherwise $RB_{start} = 0, 1, 2, \ldots, N_{BWP}^{active} - 1$ If K>1, then $RB_{start} = 0, K, 2 \cdot K, \ldots, N_{BWP}^{initial} \cdot K - K$; otherwise $RB_{start} = 0, K, 2 \cdot K, \ldots, N_{BWP}^{active} - K$ The value range of $L_{RBs}$ may be any of the following:

$L_{RBs} = K, 2 \cdot K, \ldots, \min(N_{BWP}^{initial} \cdot K, N_{BWP}^{active})$ $L_{RBs} = K, 2 \cdot K, \ldots, \min(N_{BWP}^{initial} \cdot K, N_{BWP}^{active}) \cdot K$ $L_{RBs}=K, 2\cdot K, \ldots, N_{BWP}^{initial}\cdot K$ $L_{RBs}=K, 2\cdot K, \ldots, N_{BWP}^{active}\cdot K$ If $N_{BWP}^{active} > N_{BWP}^{initial}$, then $L_{RBs}=K, 2\cdot K, \ldots, N_{BWP}^{initial}\cdot K$; otherwise $L_{RBs}=1, 2, \ldots, N_{BWP}^{active}$ If $N_{BWP}^{active} > N_{BWP}^{initial}$, then $L_{RBs}=K, 2\cdot K, \ldots, N_{BWP}^{initial}\cdot K$; otherwise $L_{RBs}=K, 2\cdot K, \ldots, N_{BWP}^{active}$ If $K>1$, then $L_{RBs}=K, 2\cdot K, \ldots, N_{BWP}^{initial}\cdot K$; otherwise $L_{RBs}=1, 2, \ldots, N_{BWP}^{active}$ If $K>1$, then $L_{RBs}=K, 2\cdot K, \ldots, N_{BWP}^{initial}\cdot K$; otherwise $L_{RBs}=K, 2\cdot K, \ldots, N_{BWP}^{active}$ $RB_{start}$ and/or $L_{RBs}$ can satisfy one or more of the following relationships (any combination of "and" or "or" when applicable):

$L_{RBs} \geq 1$ $L_{RBs} \leq \min(N_{BWP}^{initial}\cdot K, N_{BWP}^{active}) - RB_{start}$ $L_{RBs} \leq \min(N_{BWP}^{initial}, N_{BWP}^{active}) \cdot K - RB_{start}$ $L_{RBs} \leq N_{BWP}^{initial}\cdot K - RB_{start}$ $L_{RBs} \leq N_{BWP}^{active}\cdot K - RB_{start}$ If $N_{BWP}^{active} > N_{BWP}^{initial}$, then $L_{RBs} \leq N_{BWP}^{initial}\cdot K - RB_{start}$; otherwise $L_{RBs} \leq N_{BWP}^{active} - RB_{start}$ If $K>1$, then $L_{RBs} \leq N_{BWP}^{initial}\cdot K - RB_{start}$; otherwise $L_{RBs} \leq N_{BWP}^{active} - RB_{start}$ For another example, if the frequency domain resource assignment scaling conditions are not satisfied, the RIV may be defined as follows:

If $(L_{RBs}-1) \leq [N_{BWP}^{size}/2]$, then $RIV = N_{BWP}^{size}(L_{RBs}-1) + RB_{start}$ otherwise $RIV = N_{BWP}^{size}(N_{BWP}^{size} - L_{RBs}+1) + (N_{BWP}^{size}-1-RB_{start})$.

Wherein, optionally, one or more of the following are established:

$N_{BWP}^{size}$ may be defined as one of the following:
$N_{BWP}^{size} = N_{BWP}^{initial}$
$N_{BWP}^{size} = N_{BWP}^{active}$
$N_{BWP}^{size} = \max(N_{BWP}^{initial}, N_{BWP}^{active})$
$N_{BWP}^{size} = \min(N_{BWP}^{initial}, N_{BWP}^{active})$ The definition of $N_{BWP}^{size}$ is related to DCI format conditions. For example, when the DCI format conditions are satisfied, $N_{BWP}^{size} = N_{BWP}^{initial}$; when the DCI format conditions are not satisfied, $N_{BWP}^{size} = N_{BWP}^{active}$. For another example, when the DCI format conditions are not satisfied, $N_{BWP}^{size} = N_{BWP}^{initial}$; when the DCI format conditions are satisfied, $N_{BWP}^{size} = N_{BWP}^{active}$.

$RB_{start}$ and/or $L_{RBs}$ can satisfy one or more of the following relationships (any combinations of "and" or "or" when applicable):

$L_{RBs} \geq 1$ $L_{RBs} \leq \min(N_{BWP}^{initial}, N_{BWP}^{active}) - RB_{start}$ $L_{RBs} \leq \min(N_{BWP}^{size}, N_{BWP}^{active}) - RB_{start}$ $L_{RBs} \leq \min(N_{BWP}^{size}, N_{BWP}^{initial}) - RB_{start}$ $L_{RBs} \leq \max(N_{BWP}^{initial}, N_{BWP}^{active}) - RB_{start}$ $L_{RBs} \leq \max(N_{BWP}^{size}, N_{BWP}^{active}) - RB_{start}$ $L_{RBs} \leq \max(N_{BWP}^{size}, N_{BWP}^{initial}) - RB_{start}$ $L_{RBs} \leq N_{BWP}^{initial} - RB_{start}$ $L_{RBs} \leq N_{BWP}^{active} - RB_{start}$ $L_{RBs} \leq N_{BWP}^{size} - RB_{start}$ The relationship satisfied by $RB_{start}$ and/or $L_{RBs}$ is related to DCI format conditions. For example, any of the following is established:

when the DCI format conditions are satisfied, $L_{RBs} \leq \min(N_{BWP}^{initial}, N_{BWP}^{active}) - RB_{start}$; when the DCI format conditions are not satisfied, $L_{RBs} \leq N_{BWP}^{size} - RB_{start}$.

when the DCI format conditions are satisfied, $L_{RBs} \leq \min(N_{BWP}^{initial}, N_{BWP}^{active}) - RB_{start}$; when the DCI format conditions are not satisfied, $L_{RBs} \leq N_{BWP}^{active} - RB_{start}$.

when the DCI format conditions are satisfied, $L_{RBs} \leq \min(N_{BWP}^{size}, N_{BWP}^{active}) - RB_{start}$; when the DCI format conditions are not satisfied, $L_{RBs} \leq N_{BWP}^{active} - RB_{start}$.

when the DCI format conditions are satisfied, $L_{RBs} \leq \min(N_{BWP}^{size}, N_{BWP}^{active}) - RB_{start}$; when the DCI format conditions are not satisfied, $L_{RBs} \leq N_{BWP}^{size} - RB_{start}$.

when the DCI format conditions are not satisfied, $L_{RBs} \leq \min(N_{BWP}^{initial}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{initial}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{size}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{size}, N_{BWP}^{active}) - RB_{start}$; when the DCI format conditions are satisfied, $L_{RBs} \leq N_{BWP}^{size} - RB_{start}$.

The value range of $RB_{start}$ may be any of the following:

$RB_{start}=0,1,2,\ldots,\min(N_{BWP}^{initial}, N_{BWP}^{active})-1$ $RB_{start}=0,1,2,\ldots,\min(N_{BWP}^{size}, N_{BWP}^{active})-1$ $RB_{start}=0,1,2,\ldots,\min(N_{BWP}^{size}, N_{BWP}^{initial})-1$ $RB_{start}=0,1,2,\ldots,\max(N_{BWP}^{initial}, N_{BWP}^{active})-1$ $RB_{start}=0,1,2,\ldots,\max(N_{BWP}^{size}, N_{BWP}^{active})-1$ $RB_{start}=0,1,2,\ldots,\max(N_{BWP}^{size}, N_{BWP}^{initial})-1$ $RB_{start}=0,1,2,\ldots,N_{BWP}^{initial}-1$ $RB_{start}=0,1,2,\ldots,N_{BWP}^{active}-1$ $RB_{start}=0,1,2,\ldots,N_{BWP}^{size}-1$ The value range of $RB_{start}$ is related to DCI format conditions. For example, any of the following is established:

when the DCI format conditions are satisfied, $RB_{start}=0, 1, 2, \ldots, \min(N_{BWP}^{initial}, N_{BWP}^{active})-1$; when the DCI format conditions are not satisfied, $RB_{start}=0, 1, 2, \ldots, N_{BWP}^{size}-1$.

when the DCI format conditions are satisfied, $RB_{start}=0, 1, 2, \ldots, \min(N_{BWP}^{initial}, N_{BWP}^{active})-1$; when the DCI format conditions are not satisfied, $RB_{start}=0, 1, 2, \ldots, N_{BWP}^{active}-1$.

when the DCI format conditions are satisfied, $RB_{start}=0, 1, 2, \ldots, \min(N_{BWP}^{size}, N_{BWP}^{active})-1$; when the DCI format conditions are not satisfied, $RB_{start}=0, 1, 2, \ldots, N_{BWP}^{active}-1$.

when the DCI format conditions are satisfied, $RB_{start}=0, 1, 2, \ldots, \min(N_{BWP}^{size}, N_{BWP}^{active})-1$; when the DCI format conditions are not satisfied, $RB_{start}=0, 1, 2, \ldots, N_{BWP}^{size}-1$.

when the DCI format conditions are not satisfied, $RB_{start}=0, 1, 2, \ldots, \min(N_{BWP}^{initial}, N_{BWP}^{active})-1$; when the DCI format conditions are satisfied, $RB_{start}=0, 1, 2, \ldots, N_{BWP}^{size}-1$.

when the DCI format conditions are not satisfied, $RB_{start}=0, 1, 2, \ldots, \min(N_{BWP}^{initial}, N_{BWP}^{active})-1$; when the DCI format conditions are satisfied, $RB_{start}=0, 1, 2, \ldots, N_{BWP}^{active}-1$.

when the DCI format conditions are not satisfied, $RB_{start}=0, 1, 2, \ldots, \min(N_{BWP}^{size}, N_{BWP}^{active})-1$; when the DCI format conditions are satisfied, $RB_{start}=0, 1, 2, \ldots, N_{BWP}^{active}-1$.

when the DCI format conditions are not satisfied, $RB_{start}=0, 1, 2, \ldots, \min(N_{BWP}^{size}, N_{BWP}^{active})-1$; when the DCI format conditions are satisfied, $RB_{start}=0, 1, 2, \ldots, N_{BWP}^{size}-1$.

The value range of $L_{RBs}$ may be any of the following:
$L_{RBs}=1, 2, \ldots, \min(N_{BWP}^{initial}, N_{BWP}^{active})$
$L_{RBs}=1, 2, \ldots, \min(N_{BWP}^{size}, N_{BWP}^{active})$
$L_{RBs}=1, 2, \ldots, \min(N_{BWP}^{size}, N_{BWP}^{initial})$
$L_{RBs}=1, 2, \ldots, \max(N_{BWP}^{initial}, N_{BWP}^{active})$
$L_{RBs}=1, 2, \ldots, \max(N_{BWP}^{size}, N_{BWP}^{active})$
$L_{RBs}=1, 2, \ldots, \max(N_{BWP}^{size}, N_{BWP}^{initial})$
$L_{RBs}=1, 2, \ldots, N_{BWP}^{initial}$
$L_{RBs}=1, 2, \ldots, N_{BWP}^{active}$
$L_{RBs}=1, 2, \ldots, N_{BWP}^{size}$ The value range of $L_{RB}$ is related to DCI format conditions. For example, any of the following is established:

when the DCI format conditions are satisfied, $L_{RBs}=1, 2, \ldots, \min(N_{BWP}^{initial}, N_{BWP}^{active})$; when the DCI format conditions are not satisfied, $L_{RBs}=1, 2, \ldots, N_{BWP}^{size}$.

when the DCI format conditions are satisfied, $L_{RBs}=1, 2, \ldots, \min(N_{BWP}^{initial}, N_{BWP}^{active})$; when the DCI format conditions are not satisfied, $L_{RBs}=1, 2, \ldots, N_{BWP}^{active}$.

when the DCI format conditions are satisfied, $L_{RBs}=1, 2, \ldots, \min(N_{BWP}^{size}, N_{BWP}^{active})$; when the DCI format conditions are not satisfied, $L_{RBs}=1, 2, \ldots, N_{BWP}^{active}$.

when the DCI format conditions are satisfied, $L_{RBs}=1, 2, \ldots, \min(N_{BWP}^{size}, N_{BWP}^{active})$; when the DCI format conditions are not satisfied, $L_{RBs}=1, 2, \ldots, N_{BWP}^{size}$.

when the DCI format conditions are not satisfied, $L_{RBs}=1, 2, \ldots, \min(N_{BWP}^{initial}, N_{BWP}^{active})$; when the DCI format conditions are satisfied, $L_{RBs}=1, 2, \ldots, N_{BWP}^{size}$.

when the DCI format conditions are not satisfied, $L_{RBs}1, 2, \ldots, \min(N_{BWP}^{initial}, N_{BWP}^{active})$; when the DCI format conditions are satisfied, $L_{RBs}=1, 2, \ldots, N_{BWP}^{active}$.

when the DCI format conditions are not satisfied, $L_{RBs}=1, 2, \ldots, \min(N_{BWP}^{size}, N_{BWP}^{active})$; when the DCI format conditions are satisfied, $L_{RBs}=1, 2, \ldots, N_{BWP}^{active}$.

when the DCI format conditions are not satisfied, $L_{RBs}=1, 2, \ldots, \min(N_{BWP}^{size}, N_{BWP}^{active})$; when the DCI format conditions are satisfied, $L_{RBs}=1, 2, \ldots, N_{BWP}^{size}$.

Optionally, in implementation 1 of the present disclosure, the frequency domain resource assignment scaling conditions may have one or more (any combination of "and" or "or" when applicable), and each of which may be one or more of the following (any combination of "and" or "or" when applicable):

The size of the DCI format is derived from the first reference size. For example, the size of the DCI format is equal to the first reference size. For another example, when determining the size of the DCI format, the size of one or more fields in the DCI format is adjusted (for example, one or more bits are padded with 0 in the specified position of the field; the specified position of the field begins to truncate one or more bits in the specified direction), or one or more bits 0 are padded before the first field or after the last field of the DCI format, so that the size of the DCI format is equal to the first reference size.

Wherein, the first reference size may be defined in any of the following ways:

The size of DCI format 1_0 monitored in the CSS.

The size of the DCI format 1_0 monitored in the CSS.

The common size of DCI format 1_0 and DCI format 0_0 monitored in the CSS.

CORESET 0 (that is, the size of CORESET with ID 0).

The size of the initial downlink BWP.

The size of the active downlink BWP.

If CORESET 0 in the cell is configured, the first reference size is equal to the size of CORESET 0; if CORESET 0 is not configured in the cell, the first reference size is equal to the size of the initial downlink BWP.

A predefined constant.

A pre-configured value.

A value of a parameter obtained from, for example, a base station (for example, obtained through the DCI, the MAC CE or RRC signaling), or when the parameter is not configured, the default value is used.

The size of the DCI format is applied to the reference BWP satisfying the reference BWP condition. For example, the PDCCH is monitored according to the DCI format and the size of the DCI format derived from the first reference size, where the PDCCH is used to schedule the PDSCH on the reference BWP.

Wherein,

The reference BWP may be any of the following:

The active downlink BWP.

The initial downlink BWP.

BWP indicated in the DCI format. For example, the BWP indicated by the BWP indicator field.

A pre-defined or pre-configured BWP.

The BWP configured with parameters obtained from, for example, the base station (for example, obtained through the DCI, MAC CE or RRC signaling), or when the parameters are not configured, the default BWP is used.

The reference BWP condition may be any one of the following (when applicable):

No conditions (that is, the reference BWP condition may always be satisfied). For example, at this time, "an active downlink BWP that satisfies the reference BWP condition" refers to an active downlink BWP, and there are no other restrictive conditions.

The reference BWP is not the initial downlink BWP.

The reference BWP is not an active downlink BWP

The reference BWP is not the BWP indicated in the DCI format.

The reference BWP is not a predefined or pre-configured BWP.

The reference BWP is not a BWP configured with a parameter obtained from, for example, a base station (for example, obtained through the DCI, MAC CE or RRC signaling), or when the parameter is not configured, the reference BWP is not the default BWP corresponding to the parameter.

The size of the reference BWP satisfies the second reference size. Wherein, the second reference size may be defined in any of the following ways:

The size of DCI format 1_0 monitored in the CSS.

The size of DCI format 0_0 monitored in the CSS.

The common size of DCI format 1_0 and DCI format 0_0 monitored in the CSS.

The size of CORESET 0 (that is, the CORESET with ID 0).

The size of the initial downlink BWP.

The size of the active downlink BWP.

If CORESET 0 in the cell is configured, the second reference size is equal to the size of CORESET 0 if CORESET 0 is not configured in the cell, the second reference size is equal to the size of the initial downlink BWP.

A predefined constant.

A pre-configured value.

A value of a parameter obtained from, for example, the base station (for example, obtained through the DCI, MAC CE or RRC signaling), or when the parameter is not configured, the default value is used.

The size of the reference BWP does not satisfy the second reference size.

For example, if the reference BWP is "active downlink BWP" and the reference BWP condition is "reference BWP is not an initial downlink BWP," then when the size of the DCI format is applied to an active downlink BWP that is not the initial downlink BWP, the condition "the size of the DCI format is applied to the reference BWP meeting the reference BWP condition" is established.

Optionally, in Implementation 1 of the present disclosure, the frequency domain resource assignment scaling conditions may also be defined in other ways.

Optionally, in Implementation 1 of the present disclosure, the DCI format condition may be one or more of the following (any combination of "and" or "or" when applicable):

The DCI format is the DCI format 1_0 monitored in the CSS.

The DCI format is the DCI format 1_0 monitored in the USS.

The DCI format is the DCI format 1_1 monitored in the USS.

Wherein, optionally, the "monitoring" may also be replaced with "decoding."

Optionally, in Implementation 1 of the present disclosure, the DCI format conditions may also be defined in other ways.

Accordingly, in the Implementation 1 of the present disclosure, the RIV is appropriately defined, and the value ranges of $RB_{start}$ and/or $L_{RBs}$ and/or $RB'_{start}$ and $L'_{RBs}$ are configured, and the frequency domain resource assignment scaling conditions and or DCI formats are defined, to ensure that the frequency domain resources assigned in the DCI fall within the active downlink BWP, and avoid interference between users caused by the assigned frequency domain resources falling outside the active downlink BWP.

Implementation 2

The method executed by the user equipment in the second implementation of the present disclosure will be described below with reference to FIG. 2.

Figure 2:
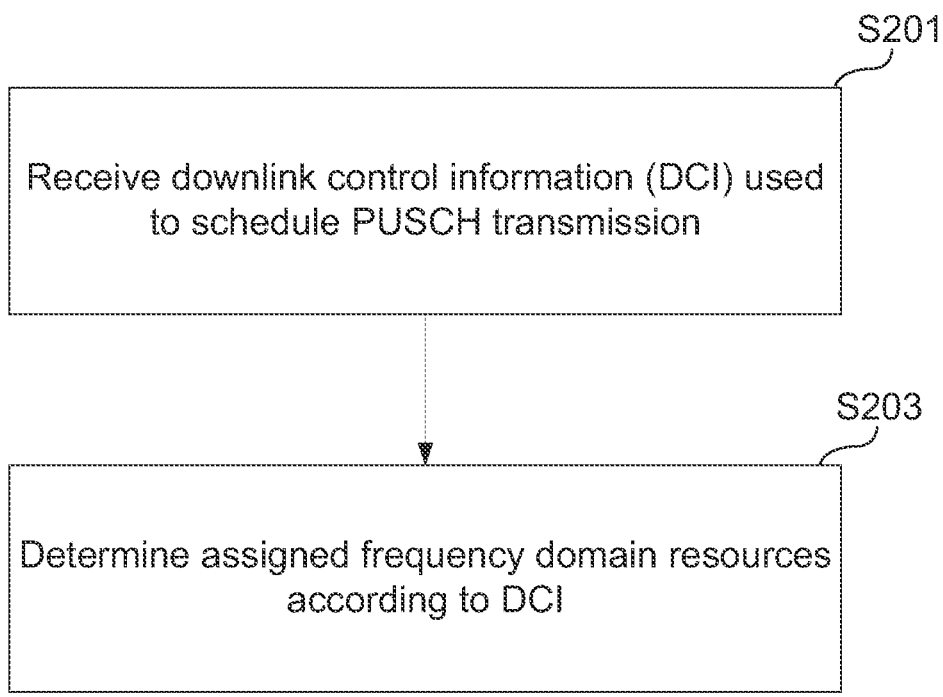
FIG. 2 is a flow chart of a method executed by a user equipment according to the second implementation of the present disclosure.

FIG. 2 is a flow chart of a method executed by a user equipment according to the second implementation of the present disclosure.

As shown in FIG. 2, in the second implementation of the present disclosure, the steps performed by the user equipment UE include: Step S201 and Step S203.

Specifically, at Step S201, the downlink control information (DCI) is received.

Wherein,

The DCI may be used for scheduling PUSCH transmission (for example, using DCI format 0_0), and may also be used for other purposes.

The DCI may be a DCI monitored in a UE-specific Search Space (USS). For example, the search space in the search space set configured through the SearchSpace IE, wherein the searchSpaceType parameter is configured as UE-Specific.

The DCI may also be a DCI monitored in a Common Search Space (CSS). For example, the search space in the search space set configured through the SearchSpace IE, wherein the searchSpaceType parameter is configured as common; another example is the search space configured through the ra-SearchSpace parameter.

The CRC of the DCI may be scrambled with the C-RNTI, MCS-C-RNTI, CS-RNTI, or other RNTI.

The DCI may include a Frequency Domain Resource Assignment (FDRA) field.

The frequency domain resource assignment method used by the DCI may be downlink resource allocation type 1 (type 1), or other downlink resource assignment types (when applicable).

Furthermore, at Step S203, the assigned frequency domain resources are determined according to the DCI. For example, a Resource Indication Value (RIV) is determined according to the FDRA field in the DCI. For example, the RIV is equal to the value corresponding to some bits of the FDRA field, and for example, the RIV is equal to the value corresponding to all bits of the FDRA field. Each value of the RIV corresponds to a starting resource block (denoted as $R_{start}$) and the length of a continuously allocated resource block (denoted as $L_{RBs}$). The resource block may be a Virtual Resource Block (VRB) or a Physical Resource Block (PRB). The definition and/or value range of the RIV and/or the $L_{RBs}$ and/or the $R_{start}$ may be related to frequency domain resource assignment scaling conditions.

For example, if the frequency domain resource assignment scaling condition is satisfied, the RIV may be defined as follows:

If $(L'_{RBs}-1) \leq [N_{BWP}^{initial}/2]$, then $RIV = N_{BWP}^{initial}(L'_{RBs}-1) + RB'_{start}$ otherwise $RIV = N_{BWP}^{initial}(N_{BWP}^{initial} - L'_{RBs}+1) + (N_{BWP}^{initial}-1-RB'_{start})$ Wherein, optionally, one or more following are established:

$L'_{RBs}$ may be equal to $L_{RBs}/K$.

$RB'_{start}$ may be equal to $RB_{start}/K$.

$RB'_{start}$ and/or $L'_{RBs}$ can satisfy one or more of the following relationships (any combination of "and" or "or" when applicable):

$L'_{RBs} \geq 1$ $L'_{RBs} \leq \min(N_{BWP}^{initial} \cdot K, N_{BWP}^{active}) - RB'_{start}$ $L'_{RBs} \leq \min(N_{BWP}^{initial}, N_{BWP}^{active}) - RB'_{start}$ $L'_{RBs} \leq N_{BWP}^{initial} - RB'_{start}$ $L'_{RBs} \leq N_{BWP}^{active} - RB'_{start}$ $L'_{RBs} \leq \min(N_{BWP}^{initial} \cdot K, N_{BWP}^{active})/K - RB'_{start}$ $L'_{RBs} \cdot K \leq \min(N_{BWP}^{initial} \cdot K, N_{BWP}^{active}) - RB'_{start} \cdot K$ $$L'_{RBs} \leq [\min(N_{BWP}^{initial} \cdot K, N_{BWP}^{active})/K] - RB'_{start}$$

$$L'_{RBs} \leq [\min(N_{BWP}^{initial} \cdot K, N_{BWP}^{active})/K] - RB'_{start}$$

$$L'_{RBs} \leq \min(N_{BWP}^{initial}, N_{BWP}^{active})/K - RB'_{start}$$

$$L'_{RBs} \cdot K \leq \min(N_{BWP}^{initial}, N_{BWP}^{active}) - RB'_{start} \cdot K$$

$$L'_{RBs} \leq [\min(N_{BWP}^{initial}, N_{BWP}^{active})/K] - RB'_{start}$$

$$L'_{RBs} \leq [\min(N_{BWP}^{initial}, N_{BWP}^{active})/K] - RB'_{start}$$

$$L'_{RBs} \leq N_{BWP}^{initial}/K - RB'_{start}$$

$$L'_{RBs} \cdot K \leq N_{BWP}^{initial} - RB'_{start} \cdot K$$

$$L'_{RBs} \leq [N_{BWP}^{initial}/K] - RB'_{start}$$

$$L'_{RBs} \leq [N_{BWP}^{initial}/K] - RB'_{start}$$

$$L'_{RBs} \leq N_{BWP}^{active}/K - RB'_{start}$$

$$L'_{RBs} \cdot K \leq N_{BWP}^{active} - RB'_{start} \cdot K$$

$$L'_{RBs} \leq [N_{BWP}^{active}/K] - RB'_{start}$$

$$L'_{RBs} \leq [N_{BWP}^{active}/K] - RB'_{start}$$

If $N_{BWP}^{active} > N_{BWP}^{initial}$, then $L'_{RBs} \leq N_{BWP}^{initial} - RB'_{start}$; otherwise $L'_{RBs} \leq N_{BWP}^{active} - RB'_{start}$ If $N_{BWP}^{active} > N_{BWP}^{initial}$, then $L'_{RBs} \leq N_{BWP}^{initial} - RB'_{start}$; otherwise $L'_{RBs} \leq N_{BWP}^{active}/K - RB'_{start}$ If $N_{BWP}^{active} > N_{BWP}^{initial}$, then $L'_{RBs} \leq N_{BWP}^{initial} - RB'_{start}$; otherwise $L'_{RBs} \cdot K \leq N_{BWP}^{active}/K - RB'_{start} \cdot K$ If $N_{BWP}^{active} > N_{BWP}^{initial}$, then $L'_{RBs} \leq N_{BWP}^{initial} - RB'_{start}$; otherwise $L'_{RBs} \leq [N_{BWP}^{active}/K] - RB'_{start}$ If $N_{BWP}^{active} > N_{BWP}^{initial}$, then $L'_{RBs} \leq N_{BWP}^{initial} - RB'_{start}$; otherwise $L'_{RBs} \leq [N_{BWP}^{active}/K] - RB'_{start}$ If K>1, then $L'_{RBs} \leq N_{BWP}^{initial} - RB'_{start}$; otherwise $L'_{RBs} \leq N_{BWP}^{active} - RB'_{start}$ If K>1, then $L'_{RBs} \leq N_{BWP}^{initial} - RB'_{start}$; otherwise $L'_{RBs} \leq N_{BWP}^{active}/K - RB'_{start}$ If K>1, then $L'_{RBs} \leq N_{BWP}^{initial} - RB'_{start}$; otherwise $L'_{RBs} \cdot K \leq N_{BWP}^{active}/K - RB'_{start} \cdot K$ If K>1, then $L'_{RBs} \leq N_{BWP}^{initial} - RB'_{start}$; otherwise $L'_{RBs} \leq [N_{BWP}^{active}/K] - RB'_{start}$ If K>1, then $L'_{RBs} \leq N_{BWP}^{initial} - RB'_{start}$; otherwise $L'_{RBs} \leq [N_{BWP}^{active}/K] - RB'_{start}$ If $N_{BWP}^{active} > N_{BWP}^{initial}$, then K is the maximum value in $\{1, 2, 4, 8\}$ that satisfies $K \leq [N_{BWP}^{active}/N_{BWP}^{initial}]$; otherwise K=1. K may also be defined in other methods.

The value range of $RB_{start}$ may be any of the following:

$$RB_{start} = 0, K, 2 \cdot K, \ldots, \min(N_{BWP}^{initial} \cdot K, N_{BWP}^{active}) - K$$

$$RB_{start} = 0, K, 2 \cdot K, \ldots, \min(N_{BWP}^{initial} \cdot K, N_{BWP}^{active}) - 1) \cdot K$$

$$RB_{start} = 0, K, 2 \cdot K, \ldots, (N_{BWP}^{initial} - 1) \cdot K$$

$$RB_{start} = 0, K, 2 \cdot K, \ldots, (N_{BWP}^{active} - 1) \cdot K$$

If $N_{BWP}^{active} > N_{BWP}^{initial}$, then $RB_{start} = 0, K, 2 \cdot K, \ldots, N_{BWP}^{initial} \cdot K - K$; otherwise $RB_{start} = 0, 1, 2, \ldots, N_{BWP}^{active} - 1$ If $N_{BWP}^{active} > N_{BWP}^{initial}$, then $RB_{start} = 0, K, 2 \cdot K, \ldots, N_{BWP}^{initial} \cdot K - K$; otherwise $RB_{start} = 0, K, 2 \cdot K, \ldots, N_{BWP}^{active} - K$ If K>1, then $RB_{start} = 0, K, 2 \cdot K, \ldots, N_{BWP}^{initial} \cdot K - K$; otherwise $RB_{start} = 0, 1, 2, \ldots, N_{BWP}^{active} - 1$ If K>1, then $RB_{start} = 0, K, 2 \cdot K, \ldots, N_{BWP}^{initial} \cdot K - K$; otherwise $RB_{start} = 0, K, 2 \cdot K, \ldots, N_{BWP}^{active} - K$ The value range of $L_{RBs}$ may be any of the following:

$$L_{RBs} = K, 2 \cdot K, \ldots, \min(N_{BWP}^{initial} \cdot K, N_{BWP}^{active})$$

$$L_{RBs} = K, 2 \cdot K, \ldots, \min(N_{BWP}^{initial} \cdot K, N_{BWP}^{active}) \cdot K$$

$$L_{RBs} = K, 2 \cdot K, \ldots, N_{BWP}^{initial} \cdot K$$

$$L_{RBs} = K, 2 \cdot K, \ldots, N_{BWP}^{active} \cdot K$$

If $N_{BWP}^{active} > N_{BWP}^{initial}$, then $L_{RBs} = K, 2 \cdot K, \ldots, N_{BWP}^{initial} \cdot K$; otherwise $L_{RBs} = 1, 2, \ldots, N_{BWP}^{active}$ If $N_{BWP}^{active} > N_{BWP}^{initial}$, then $L_{RBs} = K, 2 \cdot K, \ldots, N_{BWP}^{initial} \cdot K$; otherwise $L_{RBs} = K, 2 \cdot K, \ldots, N_{BWP}^{active}$ If K>1, then $L_{RBs} = K, 2 \cdot K, \ldots, N_{BWP}^{initial} \cdot K$; otherwise $L_{RBs} = 1, 2, \ldots, N_{BWP}^{active}$ If K>1, then $L_{RBs} = K, 2 \cdot K, \ldots, N_{BWP}^{initial} \cdot K$; otherwise $L_{RBs} = K, 2 \cdot K, \ldots, N_{BWP}^{active}$ $RB_{start}$ and/or $L_{RBs}$ can satisfy one or more of the following relationships (any combination of "and" or "or" when applicable):

$$L_{RBs} \geq 1$$

$$L_{RBs} \leq \min(N_{BWP}^{initial} \cdot K, N_{BWP}^{active}) - RB_{start}$$

$$L_{RBs} \leq \min(N_{BWP}^{initial}, N_{BWP}^{active}) \cdot K - RB_{start}$$

$$L_{RBs} \leq N_{BWP}^{initial} \cdot K - RB_{start}$$

$$L_{RBs} \leq N_{BWP}^{active} \cdot K - RB_{start}$$

If $N_{BWP}^{active} > N_{BWP}^{initial}$, then $L_{RBs} \leq N_{BWP}^{initial} \cdot K - RB_{start}$; otherwise $L_{RBs} \leq N_{BWP}^{active} - RB_{start}$ If K>1, then $L_{RBs} \leq N_{BWP}^{initial} \cdot K - RB_{start}$; otherwise $L_{RBs} \leq N_{BWP}^{active} - RB_{start}$ For another example, if the frequency domain resource assignment scaling conditions are not satisfied, the RIV may be defined as follows:

If $(L_{RBs} - 1) \leq [N_{BWP}^{size}/2]$, then $$RIV = N_{BWP}^{size}(L_{RBs} - 1) + RB_{start}$$

otherwise $$RIV = N_{BWP}^{size}(N_{BWP}^{size} - L_{RBs} + 1) + (N_{BWP}^{size} - 1 - RB_{start})$$

Wherein, optionally, one or more of the following are established:

$N_{BWP}^{size}$ may be defined as one of the following:
$N_{BWP}^{size} = N_{BWP}^{initial}$
$N_{BWP}^{size} = N_{BWP}^{active}$
$N_{BWP}^{size} = \max(N_{BWP}^{initial}, N_{BWP}^{active})$
$N_{BWP}^{size} = \min(N_{BWP}^{initial}, N_{BWP}^{active})$ The definition of $N_{BWP}^{size}$ is related to DCI format conditions. For example, when the DCI format conditions are satisfied, $N_{BWP}^{size} = N_{BWP}^{initial}$; when the DCI format conditions are not satisfied, $N_{BWP}^{size} = N_{BWP}^{active}$. For another example, when the DCI format conditions are not satisfied, $N_{BWP}^{size} = N_{BWP}^{initial}$; when the DCI format conditions are satisfied, $N_{BWP}^{size} = N_{BWP}^{active}$.

$RB_{start}$ and/or $L_{RBs}$ can satisfy one or more of the following relationships (any combinations of "and" or "or" when applicable):

$$L_{RBs} \geq 1$$

$$L_{RBs} \leq \min(N_{BWP}^{initial}, N_{BWP}^{active}) - RB_{start}$$

$L_{RBs} \leq \min(N_{BWP}^{size}, N_{BWP}^{active}) - RB_{start}$ $L_{RBs} \leq \min(N_{BWP}^{size}, N_{BWP}^{initial}) - RB_{start}$ $L_{RBs} \leq \max(N_{BWP}^{initial}, N_{BWP}^{active}) - RB_{start}$ $L_{RBs} \leq \max(N_{BWP}^{size}, N_{BWP}^{active}) - RB_{start}$ $L_{RBs} \leq \max(N_{BWP}^{size}, N_{BWP}^{initial}) - RB_{start}$ $L_{RBs} \leq N_{BWP}^{initial} - RB_{start}$ $L_{RB} \leq N_{BWP}^{active} - RB_{start}$ $L_{RBs} \leq N_{BWP}^{size} - RB_{start}$ The relationship satisfied by $RB_{start}$ and/or $L_{RBs}$ is related to DCI format conditions. For example, any of the following is established:

when the DCI format conditions are satisfied, $L_{RBs} \leq \min(N_{BWP}^{initial}, N_{BWP}^{active}) - RB_{start}$; when the DCI format conditions are not satisfied, $L_{RBs} \leq N_{BWP}^{size} - RB_{start}$.

when the DCI format conditions are satisfied, $L_{RBs} \leq \min(N_{BWP}^{initial}, N_{BWP}^{active}) - RB_{start}$; when the DCI format conditions are not satisfied, $L_{RBs} \leq N_{BWP}^{active} - RB_{start}$.

when the DCI format conditions are satisfied, $L_{RBs} \leq \min(N_{BWP}^{size}, N_{BWP}^{active}) - RB_{start}$; when the DCI format conditions are not satisfied, $L_{RBs} \leq N_{BWP}^{active} - RB_{start}$.

when the DCI format conditions are satisfied, $L_{RBs} \leq \min(N_{BWP}^{size}, N_{BWP}^{active}) - RB_{start}$; when the DCI format conditions are not satisfied, $L_{RBs} \leq N_{BWP}^{size} - RB_{start}$.

when the DCI format conditions are not satisfied, $L_{RBs} \leq \min(N_{BWP}^{initial}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{initial}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{size}, N_{BWP}^{active}) - RB_{start}$; when the DCI format conditions are satisfied, $L_{RBs} \leq N_{BWP}^{active} - RB_{start}$.

when the DCI format conditions are not satisfied, $L_{RBs} \leq \min(N_{BWP}^{initial}, N_{BWP}^{active}) - RB_{start}$; when the DCI format conditions are satisfied, $L_{RBs} \leq N_{BWP}^{size} - RB_{start}$.

The value range of $RB_{start}$ may be any of the following:

$RB_{start} = 0, 1, 2, \ldots, \min(N_{BWP}^{initial}, N_{BWP}^{active}) - 1$ $RB_{start} = 0, 1, 2, \ldots, \min(N_{BWP}^{size}, N_{BWP}^{active}) - 1$ $RB_{start} = 0, 1, 2, \ldots, \min(N_{BWP}^{size}, N_{BWP}^{initial}) - 1$ $RB_{start} = 0, 1, 2, \ldots, \max(N_{BWP}^{initial}, N_{BWP}^{active}) - 1$ $RB_{start} = 0, 1, 2, \ldots, \max(N_{BWP}^{size}, N_{BWP}^{active}) - 1$ $RB_{start} = 0, 1, 2, \ldots, \max(N_{BWP}^{size}, N_{BWP}^{initial}) - 1$ $RB_{start} = 0, 1, 2, \ldots, N_{BWP}^{initial} - 1$ $RB_{start} = 0, 1, 2, \ldots, N_{BWP}^{active} - 1$ $RB_{start} = 0, 1, 2, \ldots, N_{BWP}^{size} - 1$ The value range of $RB_{start}$ is related to DCI format conditions. For example, any of the following is established:

when the DCI format conditions are satisfied, $RB_{start} = 0, 1, 2, \ldots, \min(N_{BWP}^{initial}, N_{BWP}^{active}) - 1$; when the DCI format conditions are not satisfied, $RB_{start} = 0, 1, 2, \ldots, N_{BWP}^{size} - 1$.

when the DCI format conditions are satisfied, $RB_{start} = 0, 1, 2, \ldots, \min(N_{BWP}^{initial}, N_{BWP}^{active}) - 1$; when the DCI format conditions are not satisfied, $RB_{start} = 0, 1, 2, \ldots, N_{BWP}^{active} - 1$.

when the DCI format conditions are satisfied, $RB_{start} = 0, 1, 2, \ldots, \min(N_{BWP}^{size}, N_{BWP}^{active}) - 1$; when the DCI format conditions are not satisfied, $RB_{start} = 0, 1, 2, \ldots, N_{BWP}^{active} - 1$.

when the DCI format conditions are satisfied, $RB_{start} = 0, 1, 2, \ldots, \min(N_{BWP}^{size}, N_{BWP}^{active}) - 1$; when the DCI format conditions are not satisfied, $RB_{start} = 0, 1, 2, \ldots, N_{BWP}^{size} - 1$.

when the DCI format conditions are not satisfied, $RB_{start} = 0, 1, 2, \ldots, \min(N_{BWP}^{initial}, N_{BWP}^{active}) - 1$; when the DCI format conditions are satisfied, $RB_{start} = 0, 1, 2, \ldots, N_{BWP}^{size} - 1$.

when the DCI format conditions are not satisfied, $RB_{start} = 0, 1, 2, \ldots, \min(N_{BWP}^{initial}, N_{BWP}^{active}) - 1$; when the DCI format conditions are satisfied, $RB_{start} = 0, 1, 2, \ldots, N_{BWP}^{active} - 1$.

when the DCI format conditions are not satisfied, $RB_{start} = 0, 1, 2, \ldots, \min(N_{BWP}^{size}, N_{BWP}^{active}) - 1$; when the DCI format conditions are satisfied, $RB_{start} = 0, 1, 2, \ldots, N_{BWP}^{active} - 1$.

when the DCI format conditions are not satisfied, $RB_{start} = 0, 1, 2, \ldots, \min(N_{BWP}^{size}, N_{BWP}^{active}) - 1$; when the DCI format conditions are satisfied, $RB_{start} = 0, 1, 2, \ldots, N_{BWP}^{size} - 1$.

The value range of $L_{RBs}$ may be any of the following:

$L_{RBs} = 1, 2, \ldots, \min(N_{BWP}^{initial}, N_{BWP}^{active})$ $L_{RBs} = 1, 2, \ldots, \min(N_{BWP}^{size}, N_{BWP}^{active})$ $L_{RBs} = 1, 2, \ldots, \min(N_{BWP}^{size}, N_{BWP}^{initial})$ $L_{RBs} = 1, 2, \ldots, \max(N_{BWP}^{initial}, N_{BWP}^{active})$ $L_{RBs} = 1, 2, \ldots, \max(N_{BWP}^{size}, N_{BWP}^{active})$ $L_{RBs} = 1, 2, \ldots, \max(N_{BWP}^{size}, N_{BWP}^{initial})$ $L_{RBs} = 1, 2, \ldots, N_{BWP}^{initial}$ $L_{RBs} = 1, 2, \ldots, N_{BWP}^{active}$ $L_{RBs} = 1, 2, \ldots, N_{BWP}^{size}$ The value range of $L_{RB}$ is related to DCI format conditions. For example, any of the following is established:

when the DCI format conditions are satisfied, $L_{RBs} = 1, 2, \ldots, \min(N_{BWP}^{initial}, N_{BWP}^{active})$; when the DCI format conditions are not satisfied, $L_{RBs} = 1, 2, \ldots, N_{BWP}^{size}$.

when the DCI format conditions are satisfied, $L_{RBs} = 1, 2, \ldots, \min(N_{BWP}^{initial}, N_{BWP}^{active})$; when the DCI format conditions are not satisfied, $L_{RBs} = 1, 2, \ldots, N_{BWP}^{active}$.

when the DCI format conditions are satisfied, $L_{RBs} = 1, 2, \ldots, \min(N_{BWP}^{size}, N_{BWP}^{active})$; when the DCI format conditions are not satisfied, $L_{RBs} = 1, 2, \ldots, N_{BWP}^{active}$.

when the DCI format conditions are satisfied, $L_{RBs} = 1, 2, \ldots, \min(N_{BWP}^{size}, N_{BWP}^{active})$; when the DCI format conditions are not satisfied, $L_{RBs} = 1, 2, \ldots, N_{BWP}^{size}$.

when the DCI format conditions are not satisfied, $L_{RBs} = 1, 2, \ldots, \min(N_{BWP}^{initial}, N_{BWP}^{active})$; when the DCI format conditions are satisfied, $L_{RBs} = 1, 2, \ldots, N_{BWP}^{size}$.

when the DCI format conditions are not satisfied, $L_{RBs} = 1, 2, \ldots, \min(N_{BWP}^{initial}, N_{BWP}^{active})$; when the DCI format conditions are satisfied, $L_{RBs} = 1, 2, \ldots, N_{BWP}^{active}$.

when the DCI format conditions are not satisfied, $L_{RBs} = 1, 2, \ldots, \min(N_{BWP}^{size}, N_{BWP}^{active})$; when the DCI format conditions are satisfied, $L_{RBs} = 1, 2, \ldots, N_{BWP}^{active}$.

when the DCI format conditions are not satisfied, $L_{RBs} = 1, 2, \ldots, \min(N_{BWP}^{size}, N_{BWP}^{active})$; when the DCI format conditions are satisfied, $L_{RBs} 1, 2, \ldots, N_{BWP}^{size}$.

Optionally, in Implementation 2 of the present disclosure, the frequency domain resource assignment scaling conditions may have one or more (any combination of "and" or "or" when applicable), and each of which may be one or more of the following (any combination of "and" or "or" when applicable):

The size of the DCI format is derived from the third reference size. For example, the size of the DCI format is equal to the third reference size. For another example, when determining the size of the DCI format, the size of one or more fields in the DCI format is adjusted (for example, one or more bits are padded with 0 in the specified position of the field; the specified position of the field begins to truncate one or more bits in the specified direction), or one or more bits 0 are padded before the first field or after the last field of the DCI format, so that the size of the DCI format is equal to the third reference size.

Wherein, the third reference size may be defined in any of the following ways:

The size of SCI format 1_0 monitored in the CSS.
The size of the DCI format 0_0 monitored in the CSS.
The common size of DCI format 1_0 and DCI format 0_0 monitored in the CSS.
The size of the initial uplink BWP.
The size of the active uplink BWP.
A predefined constant.
A preconfigured value.
A value of a parameter obtained from, for example, a base station (for example, obtained through the DCI, the MAC CE or RRC signaling), or when the parameter is not configured, the default value is used.

The size of the DCI format is applied to the reference BWP satisfying the reference BWP condition. For example, the PDCCH is monitored according to the DCI format and the size of the DCI format derived from the third reference size, where the PDCCH is used to schedule the PUSCH on the reference BWP.

Wherein,
The reference BWP may be any of the following:
The active uplink BWP.
The initial uplink BWP.
BWP indicated in the DCI format. For example, the BWP indicated by the BWP indicator field.
A pre-defined or pre-configured BWP.
The BWP configured with parameters obtained from, for example, the base station (for example, obtained through the DCI, MAC CE or RRC signaling), or when the parameters are not configured the default BWP is used.
The reference BWP condition may be any one of the following (when applicable):
No conditions (that is, the reference BWP condition may always be satisfied). For example, at this time, "an active uplink BWP that satisfies the reference BWP condition" refers to an active uplink BWP, and there are no other restrictive conditions.
The reference BWP is not the initial uplink BWP.
The reference BWP is not an active uplink BWP.
The reference BWP is not the BWP indicated in the DCI format.
The reference BWP is not a predefined or pre-configured BWP.
The reference BWP is not a BWP configured with a parameter obtained from, for example, a base station (for example, obtained through the DCI, MAC CE or RRC signaling), or when the parameter is not configured, the reference BWP is not the default BWP corresponding to the parameter.
The size of the reference BWP satisfies the fourth reference size. Wherein, the fourth reference size may be defined in any of the following ways:

The size of DCI format 1_0 monitored in the CSS.
The size of DCI format 0_0 monitored in the CSS.
The common size of DCI format 1_0 and DCI format 0_0 monitored in the CSS.
The size of the initial uplink BWP.
The size of the active uplink BWP.
A predefined constant.
A pre-configured value.
A value of a parameter obtained from, for example, the base station (for example, obtained through the DCI, MAC CE or RRC signaling), or when the parameter is not configured, the default value is used.

The size of the reference BWP does not satisfy the fourth reference size.

For example, if the reference BWP is "active uplink BWP" and the reference BWP condition is "reference BWP is not an initial uplink BWP," then when the size of the DCI format is applied to an active uplink BWP that is not the initial uplink. BWP, the condition "the size of the DCI format is applied to the reference BWP meeting the reference BWP condition" is established.

Optionally, in implementation 2 of the present disclosure, the frequency domain resource assignment scaling conditions may also be defined in other ways.

Optionally, in Implementation 2 of the present disclosure, the DCI format condition may be one or more of the following (any combination of "and" or "or" when applicable):

The DCI format is the DCI format 0_0 monitored in the CSS.
The DCI format is the DCI format 0_0 monitored in the USS.
The DCI format is the DCI format 0_1 monitored in the USS.
Wherein, optionally, the "monitoring" may also be replaced with "decoding."

Optionally, in Implementation 2 of the present disclosure, the DCI format conditions may also be defined in other ways.

Accordingly, in the Implementation 2 of the present disclosure, the RIV is appropriately defined, and the value ranges of $RB_{start}$ and/or $L_{RBs}$ and/or $RB'_{RBs}$ and are configured, and the frequency domain resource assignment scaling conditions and/or DCI formats are defined, to ensure that the frequency domain resources assigned in the DCI fall within the active uplink BWP, and avoid interference between users caused by the assigned frequency domain resources falling outside the active uplink BWP.

Implementation 3

The method executed by the user equipment in the third implementation of the present disclosure will be described below with reference to FIG. 3.

Figure 3:
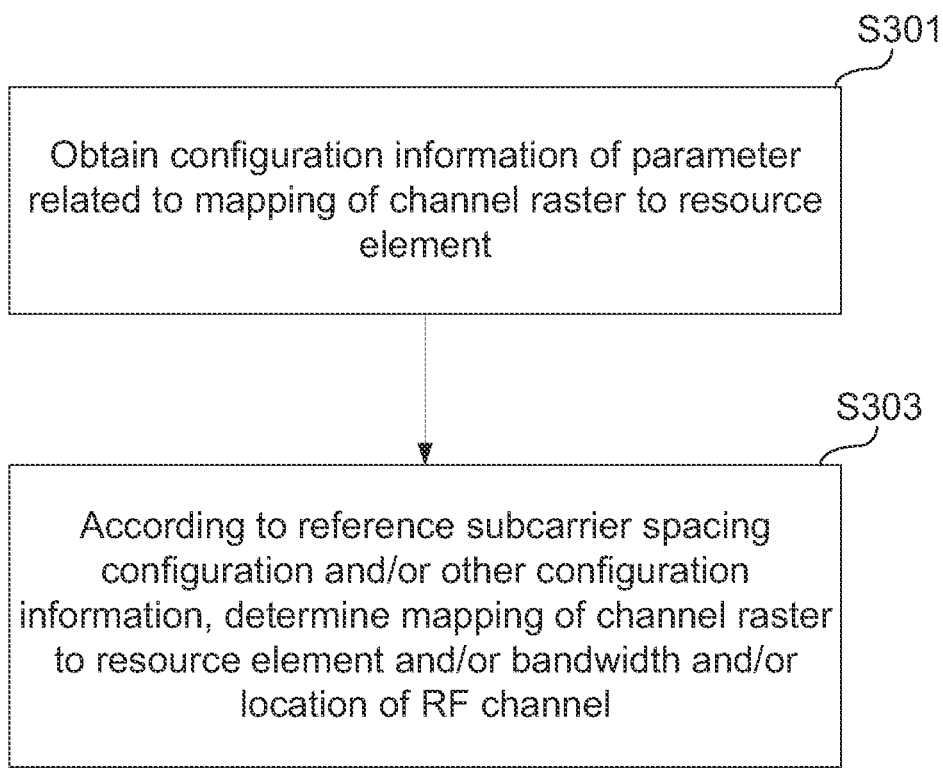
FIG. 3 is a flow chart of a method executed by a user equipment according to the third implementation of the present disclosure.

FIG. 3 is a flow chart of a method executed by a user equipment according to the third implementation of the present disclosure.

As shown in FIG. 3, in the third implementation of the present disclosure, the steps performed by the user equipment UE include; Step S301 and Step S303.

Specifically, at Step S301, the configuration information of the parameter related to the mapping of the channel raster to the resource element (such as whether the parameter has been configured or the value configured by the parameter) is obtained. For example, Step S301 includes obtaining the configuration information of the parameter from predefined information or pre-configuration information, or obtaining the configuration information of the parameter from the base station, or obtaining the configuration information of the parameter from other UEs, or using the default configuration information when the parameter is not configured.

Wherein, the parameters may include:

Reference subcarrier spacing configuration (denoted as rf-subcarrierSpacing). For example, rf-subcarrierSpacing equal to 0, 1, 2, 3, and 4 indicates that the corresponding reference subcarrier spacing is 15 kHz, 30 kHz, 60 kHz 120 kHz, and 240 kHz, respectively.

For example, the configuration information of the parameter rf-subcarrierSpacing is obtained through DCI.

For another example, the configuration information of the parameter rf-subcarrierSpacing is obtained through a MAC CE.

For another example, the configuration information of the parameter rf-subcarrierSpacing is obtained through RRC signaling (for example, one or more fields in MIB or SIB1).

For another example, the value of the parameter rf-subcarrierSpacing is a predefined or pre-configured value. For example, the parameter rf-subcarrierSpacing is equal to any value in {0, 1, 2, 3, 4}.

Optionally, the configuration information of the parameter rf-subcarrierSpacing may be configured for frequency range 1 (FR1) and frequency range 2 (frequency range 2, FR2), respectively. For example, in FR1, the parameter rf-subcarrierSpacing may take any value in {0, 1, 2} (for example, 0); in FR2, the parameter rf-subcarrierSpacing may take any value in {2, 3, 4} (for example, 2).

Furthermore, at Step S303, according to the reference subcarrier spacing configuration, and/or other configuration information, the mapping of the channel raster to the resource element, and/or the bandwidth and/or location of the RF channel is determined.

For example, if $N_{RB}$ mod 2=0, then k=0; if $N_{RB}$ mod 2=1, then k=6. Wherein, $N_{RB}$ may be the transmission bandwidth configuration (transmission bandwidth configuration) corresponding to the reference subcarrier spacing configuration. For example, $N_{RB}$ is equal to the carrier bandwidth configured by the parameter carrierBandwidth in the SCS-SpecificCarrier IE (for example, $N_{RB}$=20), wherein, optionally, the parameter subcarrierSpacing in the SCS-SpecificCarrier IE is equal to the reference subcarrier spacing configuration rf-subcarrier-Spacing (for example, the parameters subcarrierSpacing and rf-subcarrierSpacing are both equal to 0, that is, both correspond to a subcarrier spacing of 15 kHz). Furthermore, optionally, the maximum transmission bandwidth configuration corresponding to the $N_{RB}$ is equal to the minimum value that is greater than or equal to 20 in the set of maximum transmission bandwidth configuration values corresponding to the reference subcarrier spacing configuration, that is, 25, corresponding to a channel bandwidth of 5 MHz.

$N_{RB}$ may also be the maximum transmission bandwidth configuration corresponding to the reference subcarrier spacing configuration. For example, if the subcarrier spacing configuration configured by the parameter subcarrierSpacing in the SCS-SpecificCarrier IE and the reference subcarrier spacing configuration rf-subcarrierSpacing are both equal to 0 (that is, the corresponding subcarrier spacing is 15 kHz), and the carrier bandwidth configured by the parameter carrierBandwidth is 20 RBs, then $N_{RB}$ is equal to the minimum value that is greater than or equal to 20 in the set of maximum transmission bandwidth configuration values corresponding to the reference subcarrier spacing configuration, that is, 25 (corresponding to a channel bandwidth of 5 MHz). For another example, if the subcarrier spacing configuration configured by the parameter subcarrierSpacing in the SCS-SpecificCarrier IE and the reference subcarrier spacing configuration rf-subcarrierSpacing are both equal to 0 (that is, the corresponding subcarrier spacing is 15 kHz), and the carrier bandwidth configured by the parameter carrierBandwidth is 40 RBs, then $N_{RB}$ is equal to the minimum value that is greater than or equal to 40 in the set of maximum transmission bandwidth configuration values corresponding to the reference subcarrier spacing configuration, that is, 52 (corresponding to a channel bandwidth of 10 MHz).

$n_{CRB}$ is the number of the common resource block (CRB) corresponding to the channel raster.

k is the number of subcarriers $n_{CRB}$ corresponding to the channel raster.

The channel raster corresponds to an RF reference frequency, and the RF reference frequency is used to identify the location of the RF channel.

Accordingly, the third implementation of the present disclosure defines the reference subcarrier spacing configuration, so that the UE may still uniquely determine the mapping of the channel raster to the resource element and/or the bandwidth and/or location of the RF channel while the base station is configured with multiple subcarrier spacing, and thereby, ensure that the signal transmitted by the UE is consistent with the frequency configured and/or indicated by the base station.

Implementation 4

The method executed by the user equipment in the fourth implementation of the present disclosure will be described below with reference to FIG. 4.

Figure 4:
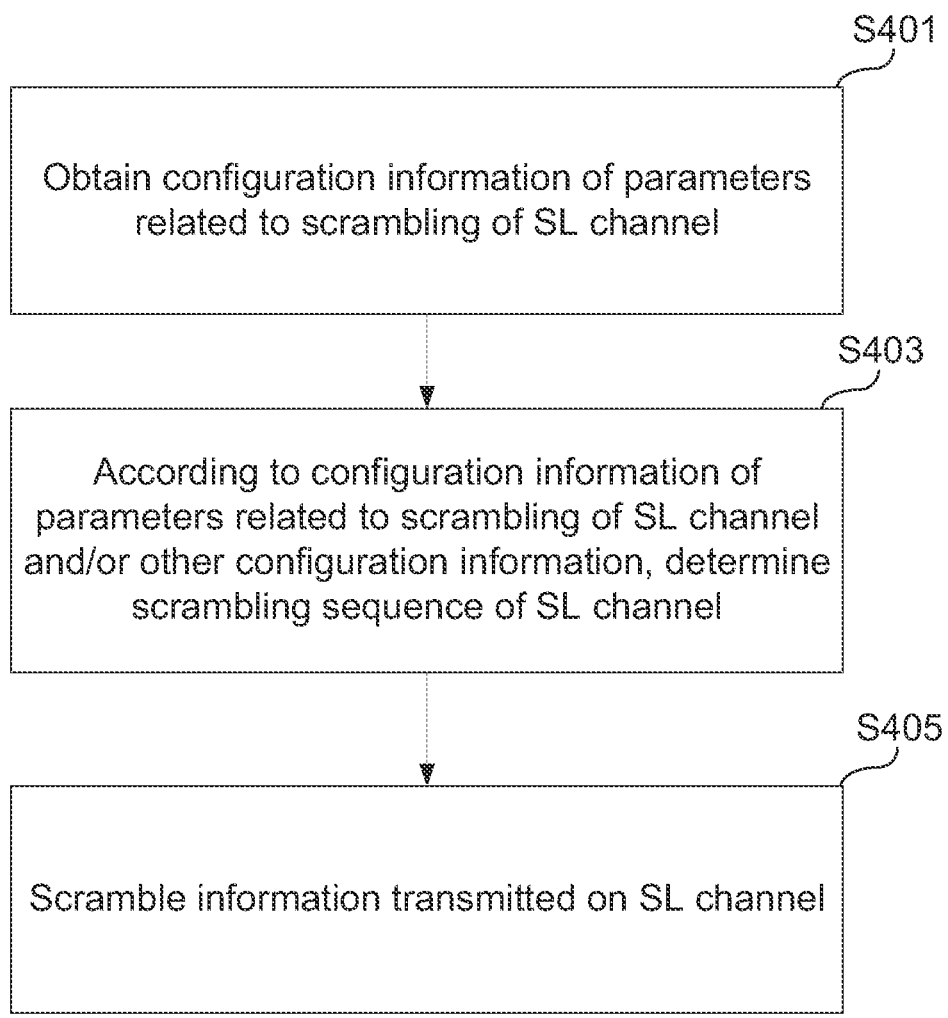
FIG. 4 is a flow chart of a method executed by a user equipment according to the fourth implementation of the present disclosure.

FIG. 4 is a flow chart of a method executed by a user equipment according to the fourth implementation of the present disclosure.

As shown in FIG. 4, in the fourth implementation of the present disclosure, the steps performed by the user equipment UE include: Step S401, Step S403 and S405.

Specifically, at Step S401, the configuration information of the parameters related to scrambling of the SL channel (such as whether the parameter has been configured, or the value configured by the parameter) is obtained. For example, the configuration information from predefined information or pre-configuration information is obtained, or the configuration information from a base station is obtained (for example, obtaining the configuration information through the DCI, MAC CE or RRC signaling), or the configuration information from other UEs is obtained, or use a default value when the parameter is not configured, or a combination of the above methods.

Wherein,

The SL channel may be a channel related to the SL synchronization, or a channel related to the SL communication, or other channels transmitted on the SL carrier. Specifically, the channel may be the PSBCH, PSCCH, PSSCH, PSFCH, or other SL channels.

The parameters may include:

An ID related to the scrambling of the SL channel (denoted as $N_{ID}^{SL,scr}$). Wherein, optionally, the ID may be a UE ID used to identify a source UE or a destination UE when SL synchronization, SL communication or other channels are transmitted on the SL carrier. For example, the higher layer UE ID (i.e., higher than the physical layer, such as the application layer, TCP/IP layer, the SDAP layer, the RRC layer, the PDCP layer, the RLC layer, and the MAC layer), and for another example, the physical layer UE ID (optionally, also referred to as layer 1UE ID). Optionally, the UE ID may be used to identify a UE or a group of UEs (including one or more UEs); when the UE ID is used to identify a group of UEs, the UE ID may be referred to as the group ID or UE group ID. Correspondingly, the source UE ID may be referred to as the source group ID or source UE group ID, and the target UE ID may be referred to as the target group ID or target UE group ID. Optionally, when referring to the UE ID or the group ID, it may refer to the integer corresponding to a part of the UE ID or the group ID bits (such as 8 least significant bits, or 8 most significant bits, or 16 the least significant bits, or 16 most significant bits), it may also refer to the integer corresponding to all the bits of the UE ID or the group ID.

Optionally, the ID may be a predefined or pre-configured constant, or a value configured through the DCI, MAC CE or RRC signaling. For example, 0, 65535, or 4294967295.

Optionally, the ID may be an SL synchronization ID, such as an ID carried in the SL PSS and/or SL SSS. The value range set of the SL synchronization ID may be $\{0, 1, \ldots, 83\}$, it may also be $\{0, 1, \ldots, 167\}$, or it may be $\{0, 1, \ldots, 251\}$, it may also be $\{0, 1, \ldots, 335\}$, it may also be $\{0, 1, \ldots, 419\}$, it may also be $\{0, 1, \ldots, 503\}$, it may also be $\{0, 1, \ldots, 587\}$, it may be $\{0, 1, \ldots, 671\}$, it may be $\{0, 1, \ldots, 755\}$, it may also be $\{0, 1, \ldots, 839\}$, it may also be $\{0, 1, \ldots, 923\}$, it may also be $\{0, 1, \ldots, 1007\}$, it may also be $\{0, 1, \ldots, 1091\}$, or may also be other integer sets.

Optionally, the ID may be a SCI ID. The SCI ID may be used to identify the SCI format, for example, the SCI format 0 uses SCI ID0, the SCI format 1 uses SCI ID1, and the SCI ID0 is not equal to SCI ID1.

Optionally, the ID may be respectively configured for one or more of unicast, groupcast, and broadcast.

Optionally, the ID may be respectively configured flat one or more of PSBCH, PSCCH, PSSCH, and PSFCH.

Optionally, the ID may be respectively configured for different resource assignment modes used by the SL channel (for example, mode 1, that is, the base station schedules the SL resources for the SL transmission of UE; in another example, mode 2, that is, the UE determines the SL resources for the SL transmission of UE).

Optionally, the ID may be equal to $C_1 \cdot ID_0 + C_2 \cdot sl_0 + C_3 \cdot sym_0 + C_4$. Wherein, $C_1, C_2, C_3$ and $C_4$ are constants, $ID_0$ is one of the source UE ID, target UE ID, source group ID, target group ID, SL synchronization ID, SCI ID, predefined or pre-configured constants, the values configured through the DCI, MAC CE or RRC signaling, $sl_0$ is the number within the subframe or frame of the time slot in which the transmission of the SL channel is located (or when the transmission of the SL channel occupies more than one time slot, the first time slot in which the transmission of the SL channel is located), and $sym_0$ is the number within the time slot or subframe or the frame of the first symbol in which the transmission of the SL channel is located. Optionally, one or more of $C_1, C_2, C_3$ and $C_4$ may be equal to zero.

For example, for the PSSCH transmitted in unicast communications, the ID may be the ID of the target UE in the unicast communications (for example, the ID of the higher level UE, or the physical layer UE ID). For another example, for the PSSCH transmitted in groupcast communications, the ID may be the target group ID in the groupcast communications (for example, the higher level UE ID, or the physical layer UE ID). For another example, for the PSSCH transmitted in broadcast communications, the ID may be a special UE ID (such as predefined or pre-configured, or configured through the DCI, MAC CE or RRC signaling) or a group ID (for example, higher level UE ID, or the physical layer UE ID) or a SL synchronization ID. For another example, for PSCCH, the ID may be a SCI ID.

Furthermore, at Step S403, the scrambling sequence of the SL channel is determined according to the configuration information of the parameters related to the scrambling of the SL channel and/or other configuration information.

Wherein,

The scrambling sequence may be a pseudo-random sequence. For example, the pseudo-random sequence c(n) can be defined as follows:

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Wherein, $N_c = 1600$ $x_1(n)$ is initialized to $x_1(0)=1$, $x_1(n)=0$, $n=1, 2, \ldots, 30$. $x_2(n)$ is initialized to $c_{init} = \Sigma_{i=0}^{30} x_2(i) \cdot 2^i$. Wherein, $c_{init}$ may be a function of $N_{ID}^{SL,scr}$, for example, $c_{init} = N_{ID}^{ID,scr}$; for another example, $c_{init} = c_5 \cdot N_{ID}^{SL,scr} + c_6$, wherein $c_5$ and $c_6$ are constants.

The scrambling sequence may also be a part or all of the bits corresponding to the ID. For example, if $N_{ID}^{SL,scr}$ is a 32-bit integer, the scrambling sequence may be a part or all of the bits in $\{N_{ID,0}^{SL,scr}, N_{ID,1}^{SL,scr}, \ldots, N_{ID,31}^{SL,scr}\}$, wherein $N_{ID,0}^{SL,scr}$ is the most significant bit of $N_{ID}^{SL,scr}$, $N_{ID,1}^{SL,scr}$ is the second most significant bit of $N_{ID}^{SL,scr}, \ldots, N_{ID,31}^{SL,scr}$ is the least significant bit of $N_{ID}^{SL,scr}$.

Furthermore, at Step S405, the information transmitted an the SL channel is scrambled.

Wherein,

The information may be a part or all of the bits transmitted on the SL channel after channel coding. Wherein, the "post-channel coding" may refer to after the last step of channel coding, such as after rate matching, or after code block concatenation, or after data and control multiplexing. For example, if the bit block corresponding to the codeword q before scrambling is $b^{(q)}(0), \ldots, b^{(q)}(M_{bit}^{(q)}-1)$, after scrambling is $\tilde{b}^{(q)}(0), \ldots, \tilde{b}^{(q)}(M_{bit}^{(q)}-1)$, wherein $M_{bit}^{(q)}$ is the number of bits transmitted by the codeword q on the SL channel, the scrambling process may be as follows:

```
Set i = 0
While i < M_bit^(q)
  b̃^(q)(i) = (b^(q)(i) + c^(q)(i)) mod 2
  i = i + 1
End while
Wherein, c^(q)(i) = c(i).
```

The information mays also be one or more CRCs generated in the CRC attachment process, for example, transport block CRC, or one or more code block CRCs, or CRC of the SCI load calculation.

For example, if the SCI load bit sequence is $a_0, a_1, \ldots, a_{A-1}$, the CRC sequence before scrambling is $p_0, p_1, \ldots, p_{L-1}$, and $L=24$, then The bit sequence after CRC attachment is $b_0, b_1, \ldots, b_{A+23}$, wherein for $k=0, 1, \ldots, A-1$, $b_k = a_k$; for $k=A, A+1, \ldots, A+23$, $b_k = a_{k-A}$.

The bit sequence after scrambling the CRC is $c_0, c_1, \ldots, c_{A+23}$, wherein for $k=0, 1, \ldots, A-1$, $c_k = b_k$; for $k=A, A+1, \ldots, A+23$, $c_k = (b_k + N_{ID,k-A+F}^{SL,scr}) \bmod 2$. Wherein, F is a constant, for example $F=0$, or $F=8$.

Accordingly, in the fourth implementation of the present disclosure, by using a special scrambling ID when initializing the scrambling sequence of the SL channel, the conflict of the scrambling sequence between the SL channels transmitted by different UEs is at least partially avoided, and thereby, potential interference between different SL channels is significantly reduced. Furthermore, the interference of using a longer ID to scramble the SL channel is also significantly reduced, or even completely avoids the issues of inability to correctly identify the source and/or destination UE IE at the physical layer due to potential conflicts of short IDs (such as physical layer IDs).

Implementation 5

Hereinafter, the method executed by the user equipment in the fifth implementation of the present disclosure will be described below with reference to FIG. 5.

Figure 5:
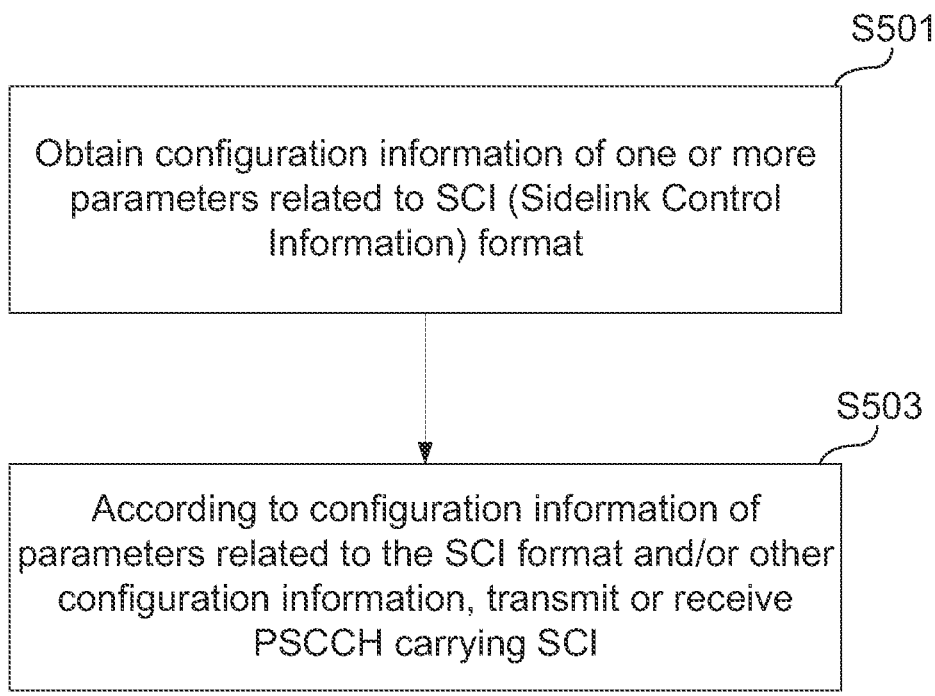
FIG. 5 is a flow chart of a method executed by a trier equipment according to the fifth implementation of the present disclosure.

FIG. 5 is a flow chart of a method executed by a user equipment according to the fifth implementation of the present disclosure.

As shown in FIG. 5, in the fifth implementation of the present disclosure, the steps performed by the user equipment UE include: Step S501 and S503.

Specifically at Step S501, the configuration information of one or more parameters related to SCI (Sidelink Control Information) format (such as whether the parameter has been configured, or the value configured by the parameter) is obtained. For example, the configuration information from predefined information or pre-configuration information is obtained, or the Configuration information from a base station is obtained (for example, obtaining the configuration information through the DCI, MAC CE or RRE signaling), or the configuration information from other UEs is obtained, or use a default value when the parameter is not configured, or a combination of the above methods.

Wherein, the parameter may indicate information related to one or more SCI formats; for each SCI format, the parameter may include one or more of the following:

An Identifier of the SCI format. For example, the SCI ID defined in the fourth implementation. For another example, it is used to identify the SL transmission/communications type (for example, unicast, groupcast, or broadcast) corresponding to the SCI. In another example, it is the identifier of the SCI format defined in other methods.

Used to scramble RNTI in SCI format.

The size of the SCI. For example, the unit of the size of the SCI may be bits, and the value range may be any subset of {8, 9, . . . , 200}.

An SCI aggregation level.

The number of repetitions of SCI.

Furthermore, at Step S503, according to the configuration information of the parameters related to the SCI format and/or other configuration information, the PSCCH carrying the SCI is transmitted or received.

Accordingly, the fifth implementation of the present disclosure configures some general parameters related to the SCI format, for example, the size of the SCI, so that after the standard protocol related to the SCI is enhanced (for example, new fields are added for the SCI format), the UEs manufactured before the enhancement of the standard protocol may still decode the enhanced SCI format and correctly interpret at least some of the fields (for example, fields related to resource reservation), and thereby, significantly improving the compatibility of the SCI design and/or the resource reservation mechanism.

Implementation 5

Hereinafter, the method executed by the user equipment in the sixth implementation of the present disclosure will be described below with reference to FIG. 6.

Figure 6:
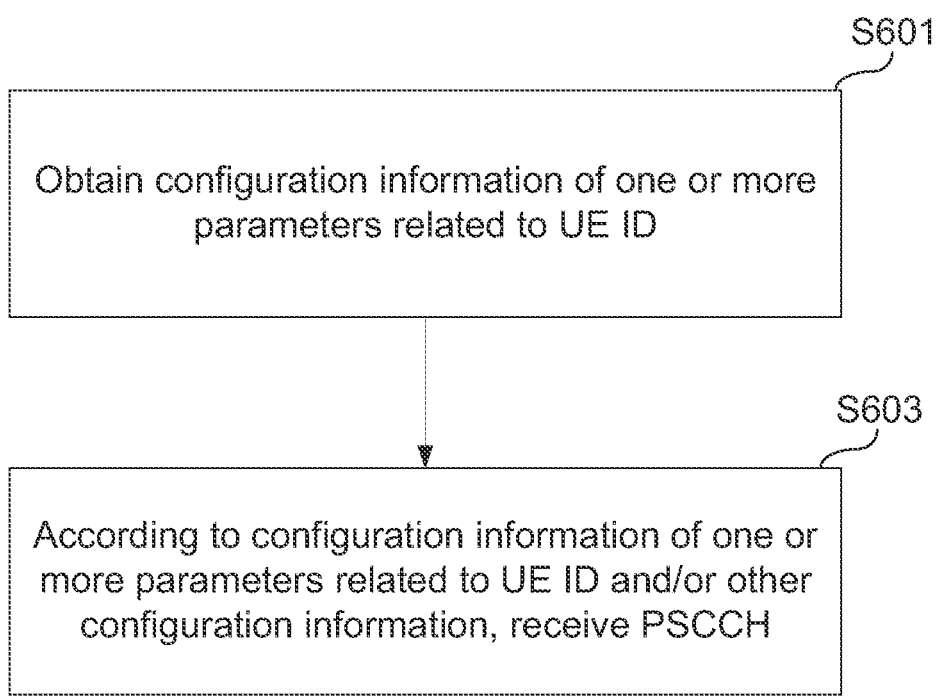
FIG. 6 is a flow chart of a method executed by a user equipment according to the sixth implementation of the present disclosure.

FIG. 6 is a flow chart of a method executed by a user equipment according to the sixth implementation of the present disclosure.

As shown in FIG. 6, in the sixth implementation of the present disclosure, the steps performed by the user equipment UE include: Step S601 and S603.

Specifically, at Step S601, the configuration information of one or more parameters related to the UE ID (such as whether the parameter has been configured, or the value configured by the parameter) is obtained. For example, the configuration information from predefined information or pre-configuration information is obtained, or the configuration information from a base station is obtained (for example, obtaining the configuration information through the DCI, MAC CE or RRC signaling), or the configuration information from other UEs is obtained, or use a default value when the parameter is not configured, or a combination of the above methods.

Wherein,

Optionally, the UE ID may be used to identify a source UE or a destination UE during SL synchronization, SL communications, or transmission of other signals or channels on the SL carrier. Optionally, the purpose of the SL synchronization, SL communications, or transmission of other signals or channels on the SL carrier is to bear the V2X related services. Correspondingly, the UE may be referred to as a V2X UE.

Optionally, the UE ID may be used to identify a UE or a group of UEs (including one or more UEs; when the UE ID is used to identify a group of UEs, the UE ID may be referred to as the group ID or UE group ID. Correspondingly, the source UE ID may be referred to as the source group ID or source UE group ID, and the target UE ID may be referred to as the target group ID or target UE group ID.

Optionally, the UE ID can be the higher layer UE ID (i.e., higher than the physical layer, such as the application layer, the TCP/IP layer, the SDAP layer, the RRC layer, the PDCP layer, the RLC layer, and the MAC layer), and for another example, the physical layer UE ID (optionally, also referred to as layer 1UE ID).

Optionally, the one or more parameters may respectively indicate the value set of the UE ID corresponding to each type of SL transmission/communications (wherein, each set includes one or more integers), for example, by one or more of the following:

The parameter unicast-IDs is used to configure the value set of UE ID used in unicast communications, for example, any subset of {0, 1, . . . , 255}. Another example is any subset of {0, 1, . . . , 511}. Another example is an subset of {0, 1, . . . , 1023}. Another example is any subset of {0, 1, . . . , 2047}. Another example is any subset of {0, 1, . . . , 4095}.

The parameter groupcast-IDs is used to configure the value set of the UE ID used in groupcast communications. For example, any subset of {0, 1, . . . , 255}. Another example is any subset of {0, 1, . . . , 511}. Another example is any subset of {0, 1, . . . , 1023}. Another example is any subset of {0, 1, . . . , 2047}. Another example is any subset of {0, 1, . . . , 4095}.

The parameter broadcast-IDs is used to configure the value set of the UE ID used in broadcast communications. For example, any subset of {0, 1, . . . , 255}. Another example is any subset of {0, 1, . . . , 511}. Another example is any subset of {0, 1, . . . , 1023}. Another example is any subset of {0, 1, . . . , 2047}.

Another example is any subset of {0, 1, . . . , 4095}.

Optionally, the set of values of the UE ID configured by the parameters unicast-IDs, groupcast-IDs, and broadcast-IDs do not overlap with each other.

Optionally, according to the configuration of the parameters unicast-IDs and groupcast-IDs, the value set of the UE ID used in broadcast communications may be derived. For example, the value sets of the UE ID used in unicast, groupcast and broadcast communications are A (configured by the parameter unicast-IDs), B (configured by the parameter groupcast-IDs), and C, respectively. If A, B, and C do not overlap each other, and the union of sets A, B, and C is $\{0, 1, \ldots, 255\}$, then set C is equal to $\{0, 1, \ldots, 255\}$–A–B.

Optionally, according to the configuration of the parameters unicast-IDs and broadcast-IDs, the value set of the UE ID used in groupcast communications may be derived. For example, the value sets of the UE ID used in unicast, groupcast and broadcast communications are A (configured by the parameter unicast-IDs), B and C (configured by the parameter broadcast-IDs). If A, B, and C do not overlap each other, and the union of sets A, B, and C is $\{0, 1, \ldots, 255\}$, then set B is equal to $\{0, 1, \ldots, 255\}$–A–C.

Optionally, according to the configuration of the parameters broadcast-IDs and groupcast-IDs, the value set of the UE ID used in unicast communications may be derived. For example, the value sets of the UE ID used in unicast, groupcast and broadcast communications are A, B (configured by the parameter groupcast-IDs) and C (configured by the parameter broadcast-IDs). If A, B, and C do not overlap each other, and the union of sets A, B, and C is $\{0, 1, \ldots, 255\}$, then set A is equal to $\{0, 1, \ldots, 255\}$–C–B.

Furthermore, at Step S603, the PSCCH is received according to the configuration information of one or more parameters related to the UE ID and/or other configuration information.

For example, if the target UE ID in the SCI carried in the PSCCH is in the set configured by the parameter unicast-IDs, it may be considered that the PSCCH and the scheduled PSSCH are used for unicast communications.

For another example, if the target UE ID in the SCI carried in the PSCCH is in the set configured by the parameter groupcast-IDs, it may be considered that the PSCCH and the scheduled PSSCH are used for groupcast communication.

For another example, if the target UE ID in the SCI carried in the PSCCH is in the set configured by the parameter broadcast-IDs, it may be considered that the PSCCH and the scheduled PSSCH are used for broadcast communication.

For another example, if the target UE ID in the SCI carried in the PSCCH is equal to the source UE ID, it may be considered that the PSCCH and the scheduled PSSCH are used for groupcast communication.

Accordingly, the sixth implementation of the present disclosure configures the value set of the UE ID corresponding to each type of SL transmission/communications (for example, unicast communications and/or groupcast communications and/or broadcast communications), so that the UE may be based on the UE ID field in the SCI (for example, target UE ID) to determine the transmission/communications type for a given SL transmission (for example, PSCCH transmission, and/or its scheduled PSSCH transmission). For example, when the UE only needs to monitor one of the transmission/communication types (for example, broadcast communications), the received PSCCH/PSSCH that does not belong to the SL transmission communications type may be filtered out efficiently.

Variations

Figure 7:
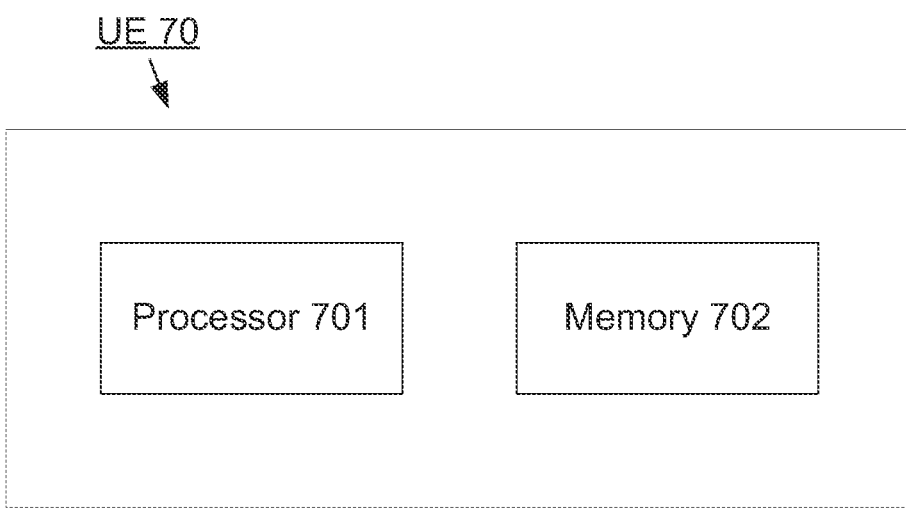
FIG. 7 is a schematic block diagram of a user equipment according to an implementation of the present disclosure.

Hereinafter, FIG. 7 is used to describe a user equipment that may execute the method executed by the user equipment described in detail above in the present disclosure as a variation.

FIG. 7 is a schematic block diagram of a user equipment according to an implementation of the present disclosure.

As shown in FIG. 7, the user equipment UE 70 includes a processor 701 and a memory 702. The processor 701 may include, for example, a microprocessor, a microcontroller, an embedded processor, and the like. The memory 702 may include, for example, volatile memory (such as random access memory RAM), hard disk drive (HDD), non-volatile memory (such as flash memory), or other memories. The memory 702 stores program instructions. When the instruction is executed by the processor 701, it may execute the above method executed by the user equipment described in detail in the present disclosure.

The method and related equipment of the present disclosure have been described above in conjunction with preferred implementations. Those skilled in the art may understand that the methods shown above are only exemplary, and the various implementations described above may be combined with each other without conflict. The method of the present disclosure is not limited to the steps and sequence shown above. The network nodes and user equipment shown above may include additional modules, for example, may also include modules that may be developed or developed in the future and be used for base stations, Mobility Management Entities (MMEs), or UEs, and so on. The various identifiers shown above are only exemplary rather than restrictive, and the present disclosure is not limited to specific information elements as examples of these identifiers. Those skilled in the art may make many changes and modifications based on the teaching of the illustrated implementations.

It should be understood that the foregoing implementations of the present disclosure may be implemented by software, hardware, or a combination of both software and hardware. For example, the various components inside the base station and user equipment in the above implementations may be implemented by a variety of devices, including but not limited to analog circuit devices, digital circuit devices, digital signal processing (DSP) circuits, programmable processing device, application specific integrated circuit (ASIC), field programmable gate array (FPGA), programmable logic device (CPLD), etc.

In the present disclosure, "base station" may refer to a mobile communications data and control switching center with larger transmission power and wider coverage area, including, functions such as resource assignment and scheduling, data reception and transmission. "User equipment" may refer to a user mobile terminal, for example, including mobile phones, laptops, and other terminal devices that may wirelessly communicate with base stations or micro base stations.

Furthermore, the implementations of the present disclosure disclosed herein may be implemented on a computer program product. More specifically, the computer program product may be a product of the following: a computer-readable medium on which computer program logic is encoded, and when executed on a computing device, the computer program logic provides related operations to implement the above-described technical scheme of the present disclosure. When executed on at least one processor of the computing system, the computer program logic causes the processor to perform the operations (methods) described in the implementations of the present disclosure. This arrangement of the present disclosure is typically provided as software, code and/or other data structures arranged or encoded on a computer-readable medium such as an optical medium (such as compact disc read-only memory (CD-ROM)), a floppy disk, a hard disk, or as one or more firmware or microcode on a ROM, RAM or PROM chip, or downloadable software images, shared databases, etc. in one or more modules. Software, firmware or such a configuration may be installed on a computing device, so that one or more processors in the computing device execute the technical solutions described in the implementations of the present disclosure.

Furthermore, each functional module or each feature of the base station device and the terminal device used in each of the foregoing implementations may be implemented or executed by a circuit, and the circuit is usually one or more integrated circuits. Circuits designed to perform the functions described in this disclosure may include general-purpose processors, digital signal processors (DSP), application-specific integrated circuits (ASIC), general-purpose integrates circuits, field programmable gate arrays (FPGA), or other programming logic devices, discrete gates or transistor logic, or discrete hardware components, or any combination of the above devices. The general-purpose processor may be a microprocessor, or the processor may be an existing processor, controller, microcontroller, or state machine. The general-purpose processor or each circuit described above may be configured by a digital circuit, or may be configured by a logic circuit. Furthermore, when technologies advances and may replace current integrated circuits appear due to advances in semiconductor technology, the present disclosure may also use integrated circuits obtained by using this advanced technology.

Although the present disclosure has been described above in conjunction with the preferred implementations of the present disclosure, those skilled in the art will understand that various modifications, substitutions and changes can be made to the present disclosure without departing from the spirit and scope of the disclosure. Therefore, the present disclosure should not be limited by the above implementations, but should be limited by the appended claims and their equivalents.

What is claimed is:

1. A method executed by a user equipment for wireless communication, the method comprising:
receiving downlink control information (DCI) for scheduling a physical downlink shared channel (PDSCH) transmission;
determining, based on a frequency domain resource assignment (FDRA) field in the received DCI, a resource indication value (RIV);
if a frequency domain resource assignment scaling condition is not satisfied, determining, based on the RIV, a first starting resource block index and a first length of continuous resource blocks;
if the frequency domain resource assignment scaling condition is satisfied, determining, based on the RIV, a second starting resource block index and a second length of continuous resource blocks, wherein the first starting resource block index is determined by multiplying the second starting resource block index by a scaling factor, and the first length of continuous resource blocks is determined by multiplying the second length of continuous resource blocks by the scaling factor; and
determining an allocated frequency resource based on the first starting resource block index and the first length of continuous resource blocks,
wherein:
the scaling factor is determined based on a ratio of a size of an active downlink bandwidth part (BWP) to a size of an initial downlink BWP,
the frequency domain resource assignment scaling condition comprises a size of a format of the DCI that is derived from a first reference size, and
the first reference size is defined based on any one of the following:
a size of a DCI format 1_0 monitored in a common search space (CSS);
a size of a DCI format 0_0 monitored in the CSS; and
a common size of the DCI format 1_0 and a common size of the DCI format 0_0 monitored in the CSS.

2. The method according to claim 1, wherein the first reference size is further defined based on any one of the following:
a size of a control resource set (CORESET) 0, which is a CORESET with an identity (ID) 0;
if the CORESET 0 in a cell is configured, the first reference size is equal to the size of the CORESET 0; and
if the CORESET 0 is not configured in the cell, the first reference size is equal to the size of the initial downlink BWP.

3. The method according to claim 1, wherein the frequency domain resource assignment scaling condition further comprises:
a size of a format of the DCI that is applied to a reference BWP that satisfies a reference BWP condition, wherein the reference BWP is any of the following:
the active downlink BWP;
the initial downlink BWP;
a BWP indicated in the format of the DCI;
a pre-defined BWP or a pre-configured BWP; and
a BWP configured by a parameter obtained from a base station, or when the parameter is not configured, a default BWP.

4. A method executed by a user equipment for wireless communication, the method comprising:
receiving downlink control information (DCI) for scheduling a physical uplink shared channel (PUSCH) transmission;
determining, based on a frequency domain resource assignment (FDRA) field in the received DCI, a resource indication value (RIV);
if a frequency domain resource assignment scaling condition is not satisfied, determining, based on the RIV, a first starting resource block index and a first length of continuous resource blocks;
if the frequency domain resource assignment scaling condition is satisfied, determining, based on the RIV, a second starting resource block index and a second length of continuous resource blocks, wherein the first starting resource block index is determined by multiplying the second starting resource block index by a scaling factor, and the first length of continuous resource blocks is determined by multiplying the second length of continuous resource blocks by the scaling factor; and
determining an allocated frequency resource based on the first starting resource block index and the first length of continuous resource blocks, wherein:
the scaling factor is determined based on a ratio of a size of an active uplink bandwidth part (BWP) to a size of an initial uplink BWP,
the frequency domain resource assignment scaling condition comprises a size of a format of the DCI that is derived from a third reference size, and
the third reference size is defined based on any one of the following:
a size of a DCI format 1_0 monitored in a common search space (CSS);
a size of a DCI format 0_0 monitored in the CSS; and
a common size of the DCI format 1_0 and a common size of the DCI format 0_0 monitored in the CSS.

5. The method according to claim 4, wherein the frequency domain resource assignment scaling condition further comprises:
a size of a format of the DCI that is applied to a reference BWP that satisfies a reference BWP condition, wherein the reference BWP is any of the following:
the active uplink BWP;
the initial uplink BWP;
a BWP indicated in the format of the DCI;
a pre-defined BWP or a pre-configured BWP; and
a BWP configured by a parameter obtained from a base station, or when the parameter is not configured, a default BWP.

6. A user equipment, comprising:
at least one processor; and
at least one memory storing one or more instructions that, when executed by the at least one processor, cause the user equipment to:
receive downlink control information (DCI) for scheduling a physical downlink shared channel (PDSCH) transmission;
determine, based on a frequency domain resource assignment (FDRA) field in the received DCI, a resource indication value (RIV);
if a frequency domain resource assignment scaling condition is not satisfied, determine, based on the RIV, a first starting resource block index and a first length of continuous resource blocks;
if the frequency domain resource assignment scaling condition is satisfied, determine, based on the RIV, a second starting resource block index and a second length of continuous resource blocks, wherein the first starting resource block index is determined by multiplying the second starting resource block index by a scaling factor, and the first length of continuous resource blocks is determined by multiplying the second length of continuous resource blocks by the scaling factor; and
determine an allocated frequency resource based on the first starting resource block index and the first length of continuous resource blocks,
wherein:
the scaling factor is determined based on a ratio of a size of an active downlink bandwidth part (BWP) to a size of an initial downlink BWP,
the frequency domain resource assignment scaling condition comprises a size of a format of the DCI that is derived from a first reference size, and
the first reference size is defined based on any one of the following:
a size of a DCI format 1_0 monitored in a common search space (CSS);
a size of a DCI format 0_0 monitored in the CSS; and
a common size of the DCI format 1_0 and a common size of the DCI format 0_0 monitored in the CSS.

7. The user equipment according to claim 6, wherein the first reference size is further defined based on any one of the following:
a size of a control resource set (CORESET) 0, which is a CORESET with an identity (ID) 0;
if the CORESET 0 in a cell is configured, the first reference size is equal to the size of the CORESET 0; and
if the CORESET 0 is not configured in the cell, the first reference size is equal to the size of the initial downlink BWP.

8. The user equipment according to claim 6, wherein the frequency domain resource assignment scaling condition further comprises:
a size of a format of the DCI that is applied to a reference BWP that satisfies a reference BWP condition, wherein the reference BWP is any of the following:
the active downlink BWP;
the initial downlink BWP;
a BWP indicated in the format of the DCI;
a pre-defined BWP or a pre-configured BWP; and
a BWP configured by a parameter obtained from a base station, or when the parameter is not configured, a default BWP.

9. The method according to claim 3, wherein the reference BWP condition comprises a size of the reference BWP satisfying a second reference size, and the second reference size being defined based on any one of the following:
the size of the DCI format 1_0 monitored in the CSS;
the size of the DCI format 0_0 monitored in the CSS; and
the common size of the DCI format 1_0 and the common size of the DCI format 0_0 monitored in the CSS.

10. The method according to claim 5, wherein the reference BWP condition comprises a size of the reference BWP satisfying a fourth reference size, and the fourth reference size being defined based on any one of the following:
the size of the DCI format 1_0 monitored in the CSS;
the size of the DCI format 0_0 monitored in the CSS; and
the common size of the DCI format 1_0 and the common size of the DCI format 0_0 monitored in the CSS.

11. The user equipment according to claim 8, wherein the reference BWP condition comprises a size of the reference BWP satisfying a second reference size, and the second reference size being defined based on any one of the following:
the size of the DCI format 1_0 monitored in the CSS;
the size of the DCI format 0_0 monitored in the CSS; and
the common size of the DCI format 1_0 and the common size of the DCI format 0_0 monitored in the CSS.

* * * * *